(12) United States Patent
Morimura et al.

(10) Patent No.: US 6,215,899 B1
(45) Date of Patent: Apr. 10, 2001

(54) MOTION AND DISPARITY ESTIMATION METHOD, IMAGE SYNTHESIS METHOD, AND APPARATUS FOR IMPLEMENTING SAME METHODS

(75) Inventors: Atsushi Morimura; Takeo Azuma, both of Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/031,193

(22) Filed: Feb. 26, 1998

Related U.S. Application Data

(62) Division of application No. 08/421,324, filed on Apr. 13, 1995, now Pat. No. 5,768,404.

(30) Foreign Application Priority Data

| Apr. 13, 1994 | (JP) | ................................. 6-074790 |
| Apr. 27, 1994 | (JP) | ................................. 6-089587 |
| Feb. 7, 1995 | (JP) | ................................. 7-019328 |

(51) Int. Cl.$^7$ ................................................. G06K 9/62
(52) U.S. Cl. ................................. 382/154; 348/47
(58) Field of Search ........................ 382/106, 154; 348/42, 46, 47, 699; 345/421; 356/12; 396/324, 325

(56) References Cited

U.S. PATENT DOCUMENTS

| 4,669,048 | * | 5/1987 | Ackermann et al. | 364/525 |
| 4,825,393 | * | 4/1989 | Nishiya | 364/560 |
| 5,019,901 | * | 5/1991 | Uomori et al. | 348/699 |
| 5,142,659 |   | 8/1992 | Rao et al. | 382/106 |
| 5,173,865 |   | 12/1992 | Koike et al. | 702/155 |
| 5,179,441 | * | 1/1993 | Anderson et al. | 358/88 |
| 5,202,928 | * | 4/1993 | Tomita et al. | 382/154 |
| 5,241,608 |   | 8/1993 | Fogel | 382/107 |
| 5,410,356 | * | 4/1995 | Kikuchi et al. | 348/699 |
| 5,487,116 | * | 1/1996 | Nakano et al. | 382/104 |
| 5,530,774 | * | 6/1996 | Fogel | 382/154 |
| 5,602,584 | * | 2/1997 | Mitsutake et al. | 348/47 |
| 5,714,997 | * | 2/1998 | Anderson | 348/39 |
| 5,717,782 | * | 2/1998 | Denneau, Jr. | 382/154 |
| 5,764,871 | * | 6/1998 | Fogel | 395/127 |
| 5,872,354 | * | 2/1999 | Hanson | 235/462 |

FOREIGN PATENT DOCUMENTS

| 64-73474 | 3/1989 | (JP) | G06F/15/70 |
| 2-268215 | 11/1990 | (JP) | G01C/11/00 |

OTHER PUBLICATIONS

Russ, "The Image Processing Handbook", 1994, p. 155–159, 165.*
T. Kanade, et al., *A Stereo Matching Algorithm with An Adaptive Window: Theory and Experiment*, School of Computer Science, Carnegie Mellon University, Pittsburgh, PA, Apr. 30, 1990.

* cited by examiner

Primary Examiner—Amelia Au
Assistant Examiner—Timothy M. Johnson
(74) Attorney, Agent, or Firm—Smith, Gambrell & Russell, LLP

(57) ABSTRACT

An image computing and processing apparatus for computing correspondence between images from a plurality of images and for obtaining disparity corresponding to the depth of an image. Also, an apparatus for synthesizing from the disparity and image data an image as viewed from a designated viewing direction. The apparatus has a base image frame memory for storing a base image, a reference image frame memory for storing a reference image, a block correlation computing circuit for computing block correlations and confidence measure for estimation by using a plurality of block sizes, a representative pixel correlation computing circuit, and an estimation integrating computing circuit for evaluating the reliability of the result of estimation by block matching on the basis of a luminance gradient, image noise, a minimum value of an evaluation yardstick for differences between blocks, and block size, and for integrating the results of estimation obtained with the plurality of block sizes.

7 Claims, 26 Drawing Sheets

■ PIXELS FOR SSD COMPUTATION

REFERENCE IMAGE

BASE IMAGE

LEFT-EYE IMAGE

RIGHT-EYE IMAGE

Fig. 24(a)
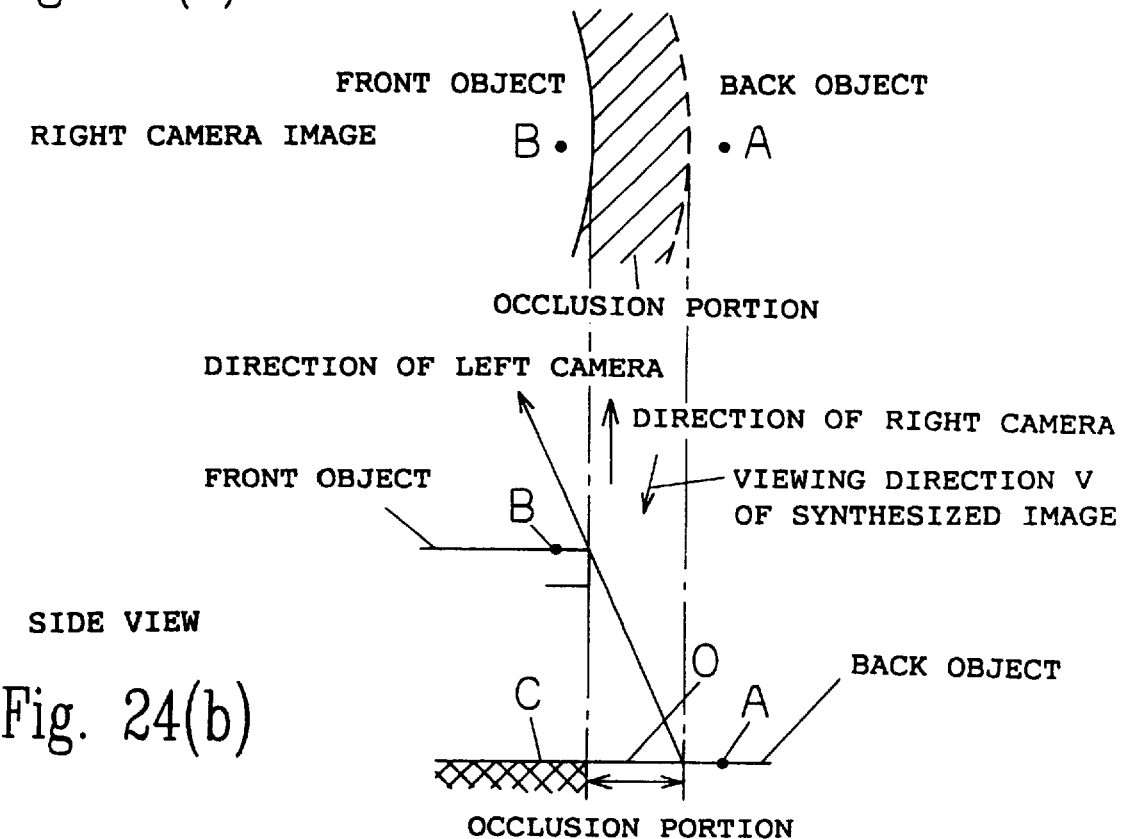
Fig. 24(b)
Fig. 24(c)
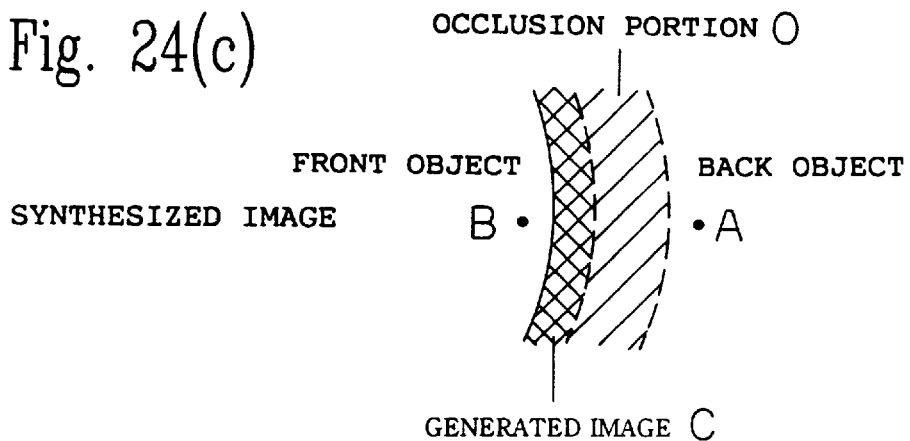

MOTION AND DISPARITY ESTIMATION METHOD, IMAGE SYNTHESIS METHOD, AND APPARATUS FOR IMPLEMENTING SAME METHODS

This application is a division of U.S. application Ser. No. 08/421,324 filed Apr. 13, 1995, now U.S. Pat. No. 5,768,404.

BACKGROUND OF THE INVENTION

1. Field of the Invention

The present invention relates to an image computing and processing apparatus for computing correspondence between images from a plurality of images and for obtaining disparity (depth) corresponding to the depth of an image, and also to an apparatus for synthesizing from the disparity and image data an image as viewed from a designated viewing direction.

2. Related Art of the Invention

For transmission and storage of moving images and multinocular stereoscopic images, it is desired to reduce the enormous amount of information involved. Further, in image capturing and image presentation, if multinocular stereoscopic images can be presented by synthesizing intermediate images from binocular stereoscopic images, the amount of information in image capturing, transmission, and storage can be reduced. To achieve this goal, many attempts have been made to reduce the redundancy of images by obtaining correlations of pixels between images and estimating the motion and depth of images.

Methods of obtaining pixel correlation can be classified broadly into two groups known as gradient methods and block matching methods. These methods have their own advantages and disadvantages. That is, with gradient methods, minute motion and disparity can be estimated with good accuracy, but the accuracy drops if the amount of estimation becomes large. Furthermore, gradient methods are susceptible to noise because of the use of gradients. Moreover, this type of method is disadvantageous in terms of realtime processing since the process involves iterative calculations to correct an estimate obtained from a gradient.

On the other hand, block matching methods can perform estimation with a constant level of accuracy regardless of the magnitude of the amount of estimation, and are resistant to noise. This type of method, however, has the problem that the proper block size differs depending on the magnitude of the luminance gradient and also on the presence or absence of a region containing discontinuities in motion and depth, the proper block size thus being dependent on the distribution of estimation.

Kanade et al. attempted to resolve this problem by performing iterative calculations whereby the block size, position, and disparity are updated using evaluation criteria accounting for luminance gradient, noise, and disparity distributions. ("A Stereo Matching Algorithm with an Adaptive Window: Theory and Experiment," by Takeo Kanade and Masatoshi Okutomi, 1990)

Further, in synthesizing an intermediate image, since image synthesis is performed only using regions where correspondence between images are established, the image is synthesized only for regions where correspondence between images can be obtained.

The above correspondence method, however, has had the problem that the amount of computation required is enormous.

Further, with the prior art method that examines correspondence between images and computes disparity, if objects are displaced from each other in the depthwise direction and a region of the object in the background is hidden from view by the object in the foreground, the correspondence cannot be determined, and it is therefore not possible to compute disparity. In particular, if the object in the foreground is positioned near the imaging device, the hidden area becomes large and the disparity cannot be obtained over a large region. Furthermore, in the prior art, since the resolution at disparity boundaries is determined by the density of correspondence calculations, there is no alternative but to perform calculations with higher density (increased number of times) if the resolution is to be improved.

Furthermore, for regions where correspondence between images is not clear, correspondence cannot be determined and, therefore, images cannot be synthesized.

SUMMARY OF THE INVENTION

In view of the above enumerated problems, it is an object of the present invention to provide a method and apparatus for motion and depth estimation capable of estimating motion and depth, with good accuracy and without performing iterative calculations, by evaluating the reliability of the result of estimation by block matching on the basis of the luminance gradient, image noise, the minimum value of the sum of squared difference (SSD) between blocks, and the block size, and by integrating the results of estimation obtained with a plurality of block sizes.

It is also an object of the present invention to prevent dropouts in synthesized images due to hidden regions by correctly estimating regions where no correspondence between images is available, from regions where correspondence between images is established.

The present invention provides:

a motion and depth estimation method for estimating motion and depth, with good accuracy and without performing iterative calculations, by evaluating the result of estimation by block matching on the basis of the luminance gradient, image noise, the minimum value of SSD, and the block size, and by integrating the results of estimation obtained with a plurality of block sizes;

a motion and disparity estimation apparatus comprising a base image frame memory for storing a base image, a reference image frame memory for storing a reference image, a block correlation computing circuit for computing block correlations and confidence measure for estimation using a plurality of block sizes, and an estimation integrating computing circuit for evaluating the result of estimation by block matching on the basis of the luminance gradient, image noise, the minimum value of SSD, and the block size, and for integrating the results of estimation obtained with the plurality of block sizes;

a disparity computing apparatus comprising corresponding point computing means for computing correspondence between two or more input image signals, disparity data computing means for computing disparity data from the computation result of the corresponding point computing means, correspondence evaluating means for obtaining correspondence evaluation from the computation result of the corresponding point computing means, and occlusion judging means for performing occlusion judgement based on the disparity data and the correspondence evaluation, wherein the correspondence between objects in two or more input images is obtained based on the respective images, any region of either image where no correspondence is available due to hiding by an object is judged using the correspondence obtained based on the other image, a region hidden by an object is determined and disparity of the hidden region is estimated from a region of an unhidden region where stable correspondence is established, and the estimated disparity is integrated with the disparity obtained by the corresponding point computation; and an image synthesizing method and apparatus for synthesizing an image as viewed from a direction other than the camera shooting direction, the image synthesizing process involving shifting an image in accordance with disparity.

In the above configuration of the present invention, by adaptively varying the block size to be selected according to the magnitude of the luminance gradient and the distribution of estimation, motion and depth are estimated with good accuracy without performing iterative calculations, the estimation process involving a constant amount of computation which is only several times larger than that of block correlation computation performed with a single block size.

If there is occlusion by an object, an image to be used as a base image is changed and correspondence is examined under conditions free from occlusion, thereby making it possible to correctly judge the occlusion.

For regions where correct correspondence cannot be established because of a disparity boundary, correspondence can be obtained by shifting the region for correspondence computation. This technique makes it possible to obtain correct correspondence up to the disparity boundary.

Furthermore, by estimating the disparity boundary using the luminance boundary and the correspondence evaluation value, disparity with high resolution can be estimated from the correspondence computation result having low resolution to the disparity boundary, thus making it possible to obtain disparity with higher accuracy efficiently.

Moreover, for regions where correspondence is uncertain, an image as viewed from a designated viewing direction can be synthesized by correcting judging the occlusion condition and using the disparity estimated from the relationship of the occlusion.

BRIEF DESCRIPTION OF THE DRAWINGS

FIGS. 24 (a) to 24 (c) are diagrams for explaining an image generating section in the image synthesizing apparatus according to the eighth embodiment of the present invention;

DESCRIPTION OF THE PREFERRED EMBODIMENTS (Embodiment 1)

Figure 1:
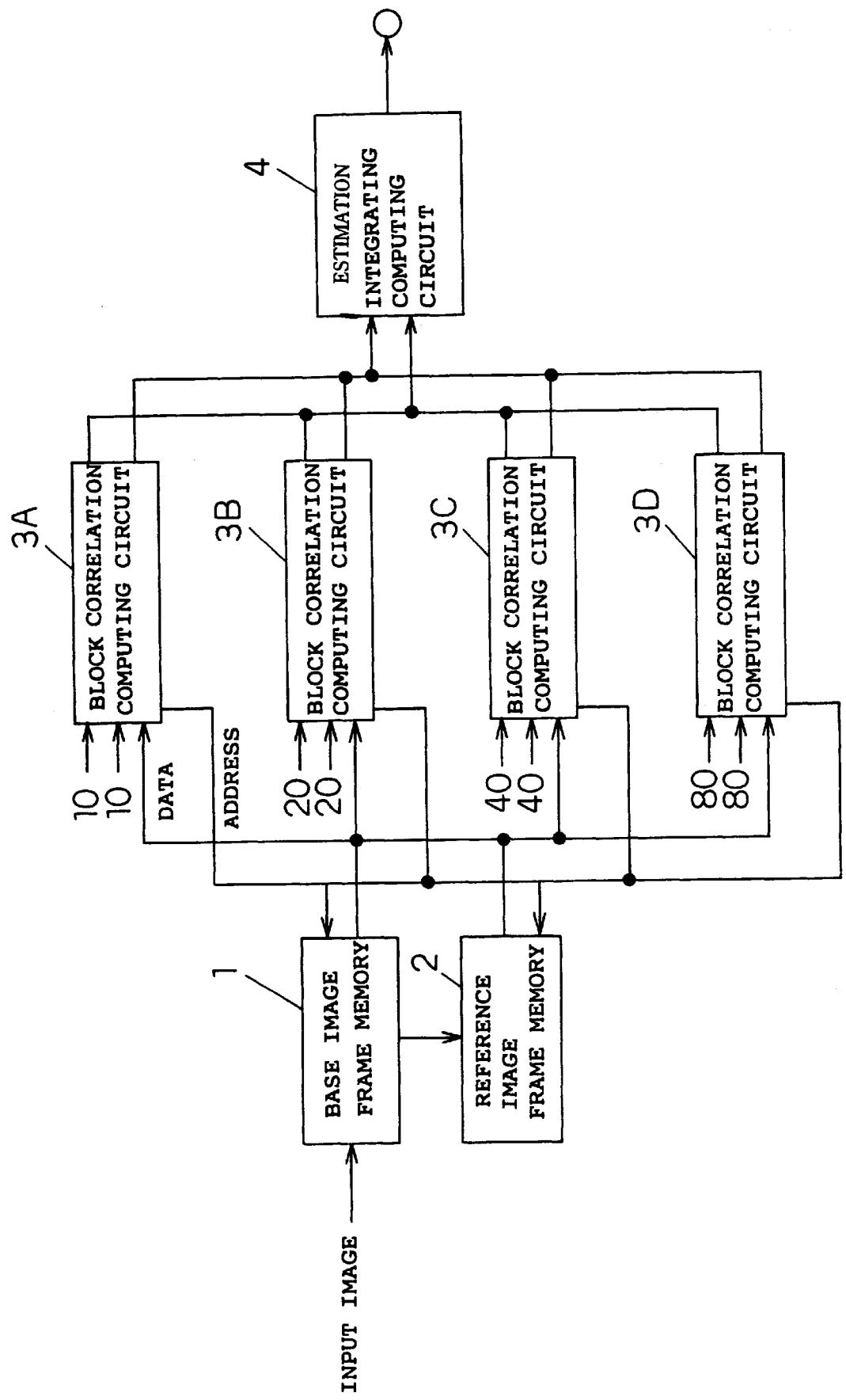
FIG. 1 is a block diagram of a motion and depth estimation apparatus according to a first embodiment of the present invention.

FIG. 1 is a block diagram of a motion and depth estimation apparatus according to a first embodiment of the present invention. In FIG. 1, reference numeral 1 is a base image frame memory for storing a base image, 2 is a reference image frame memory for storing a reference image, 3A, 3B, 3C, and 3D are block correlation computing circuits for computing block correlations using different block sizes (10×10, 20×20, 40×40, and 80×80, respectively), and 4 is an estimation integrating computing circuit for integrating the results of estimation obtained with the different block sizes.

The operation of the above configuration will be described below. The base image frame memory 1 stores a frame of base image in which a base block is set for the computation of block correlation. The reference image frame memory 2 stores a frame of reference image which is used for the computation of correlation with the base block. The block correlation computing circuits 3A, 3B, 3C, and 3D compute block correlations using the respectively different block sizes, and also computes confidence measure for estimation obtained. The estimation integrating computing circuit 4 sequentially reads the estimation and the confidence measure from the block correlation computing circuits 3A, 3B, 3C, and 3D, applies weights according to the respective block sizes, and selects the estimate supplied from the block correlation computing circuit that gives the minimum evaluation value after weighting.

Figure 2:
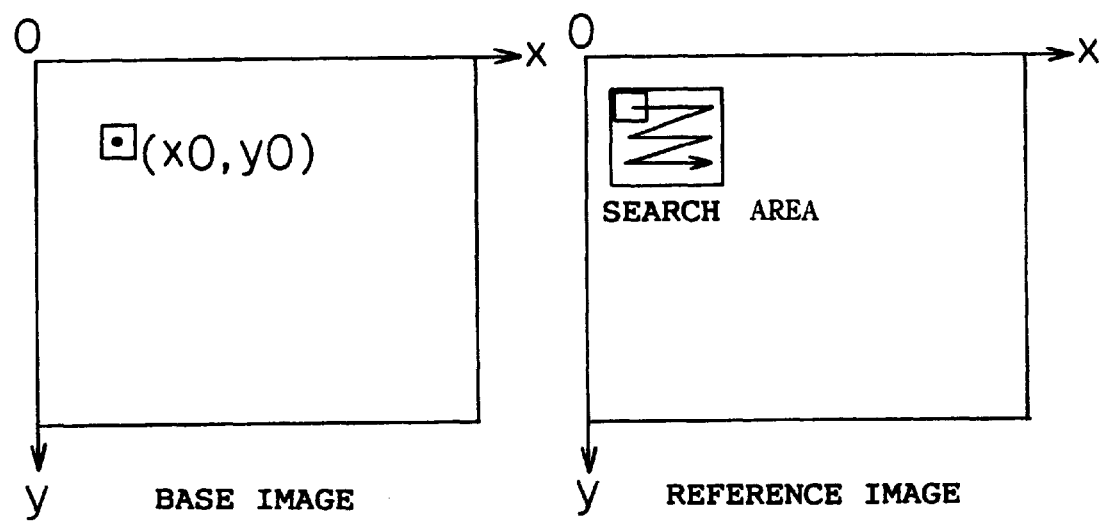
FIG. 2 is a diagram for explaining block correlation computation.

The process of block correlation computation will be explained with reference to FIG. 2. For a base block centered at (x0, y0) in a base image, the sum of squared difference (SSD) defined by [Equation 1] is calculated within a search area in a reference image, and (ui, vj) that gives the smallest SSD within the search area is taken as an estimate (u, v) at (x0, y0).

$$SSD = \sum_{k,l \in W} (f2(x0+ui+k, y0+vj+1) - f1(x0+k, y0+1))^2 \quad \text{[Equation 1]}$$

where f1(x, y) is the luminance value at (x, y) in the base image, f2(x, y) is the luminance value at (x, y) in the reference image, and w is the block region where correlation is computed.

Figure 3:
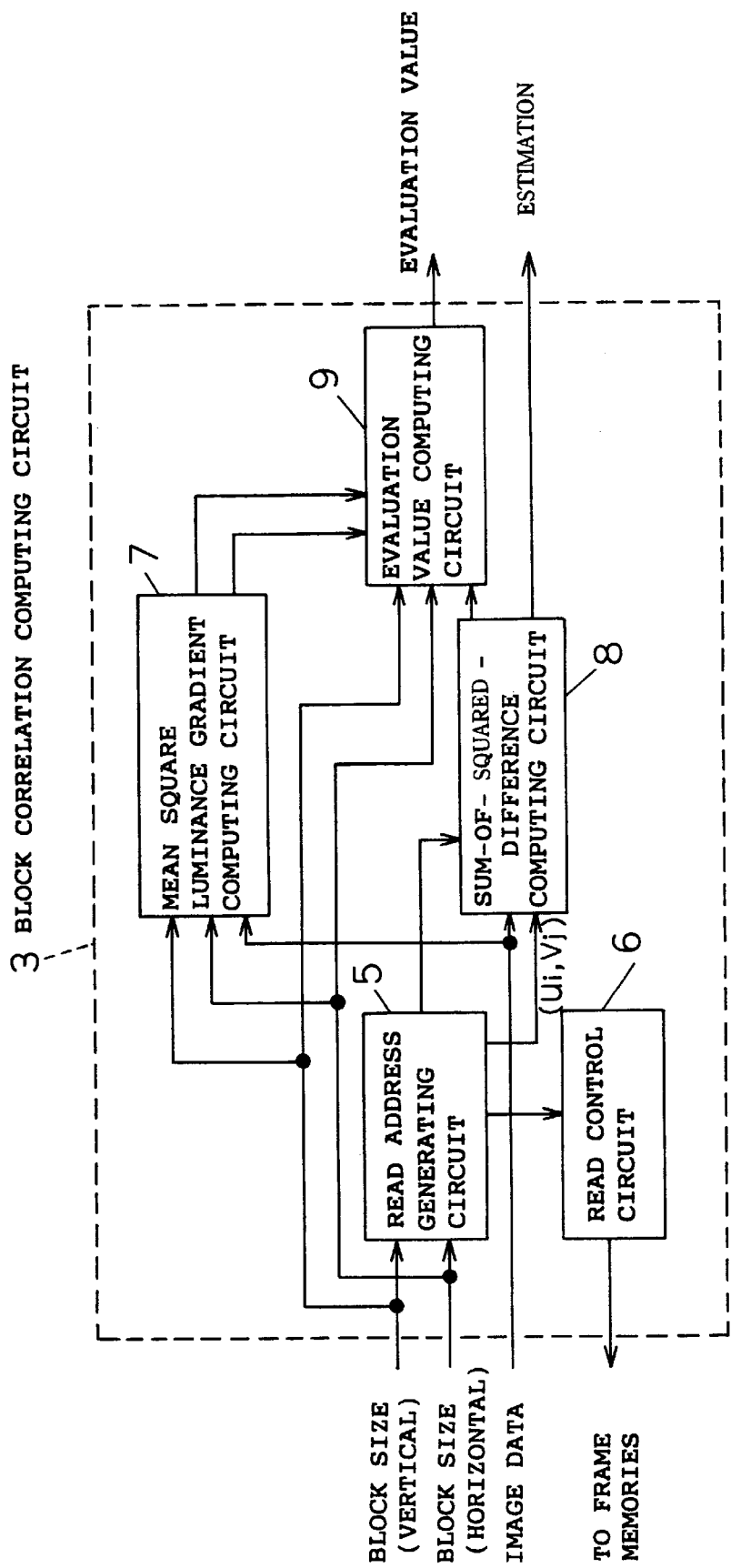
FIG. 3 is a block diagram of a block correlation computing circuit according to the first embodiment of the present invention.

FIG. 3 shows an example of the block correlation computing circuit 3. In FIG. 3, reference numeral 5 is a read address generating circuit, 6 is a read control circuit, 7 is a mean square luminance gradient computing circuit, 8 is a sum-of-squared-difference computing circuit, and 9 is an evaluation value computing circuit. The read address generating circuit 5 generates addresses so that reference blocks in the reference image are sequentially scanned, as shown in FIG. 2, within the search area for the base block in the base image, and outputs error vectors (ui, vj) representing the differences in coordinates between the base block and the reference blocks. Based on the addresses generated by the read address generating circuit 5, the read control circuit 6 outputs a control signal to the base image frame memory 1 and also to the reference image frame memory 2, and reads image data of the base block and reference block. From the image data read out by the read control circuit 6, the mean square luminance gradient computing circuit 7 computes mean square luminance gradients in the horizontal and vertical directions in the block in accordance with [Equation 2].

$$\bar{f}x^2 = \frac{1}{N} \sum_{k,l \in W} \left( \frac{\partial}{\partial x} f1(x0+k, y0+1) \right)^2 \quad \text{[Equation 2]}$$

-continued $$\bar{f}y^2 = \frac{1}{N} \sum_{k,l \in W} \left( \frac{\partial}{\partial y} f1(x0+k, y0+1) \right)^2$$

where N is the number of pixels in the block region.

From the image data of the base block and reference block read out by the read control circuit 6 and the error vectors (ui, vj), output from the address generating circuit 5, representing the differences in coordinates between the base block and the reference blocks, the sum-of-squared-difference computing circuit 8 computes the sum of squared difference within each block, selects as the estimate (u, v) the (ui, vj) that gives the smallest sum of squared difference within the search area, and outputs the minimum value SSDmin of the sum of squared difference. The evaluation value computing circuit 9 computes the confidence measure J for the estimate using [Equation 3], taking into account the luminance gradient, image noise, the minimum value of the sum of squared difference, and the block size.

$$J = |SSDmin/N - 2\sigma_n^2|/(\bar{f}x^2 + \bar{f}y^2) \quad \text{[Equation 3]}$$

where SSDmin is the minimum value of the SSD within the search area, and $2\sigma n^2$ is a constant which is determined by the image noise. In [Equation 3], n is determined by the S/N ratio and the maximum level V of the image signal given by [Equation 4] which is the equation of the S/N ratio of the image. If the noise is random noise, since SSDmin/N becomes equal to 2 $n^2$ where correct correspondence is obtained, the SSDmin/N with highest frequency of occurrence in the whole image may be assumed equal to 2 $n^2$.

Further, regarding the value of SSDmin/N where correct correspondence is obtained, variation around 2 $n^2$ becomes smaller as the block size increases; therefore, if n is determined from the SSDmin/N with highest frequency of occurrence in the whole image in block matching with a larger block size, evaluation can be made with increased stability when integrating the estimation.

$$S/N = 20 \log \frac{V}{\sigma_n} \quad \text{[Equation 4]}$$

The evaluation value J in [Equation 3] is obtained by normalizing the degree of matching in correlation computation by the luminance gradient, that is, by the characteristic amount of the luminance distribution within the block. J takes a small value when the correlation between the base block and the reference block is high; conversely, when the correlation is low, J takes a large value.

Figure 4:
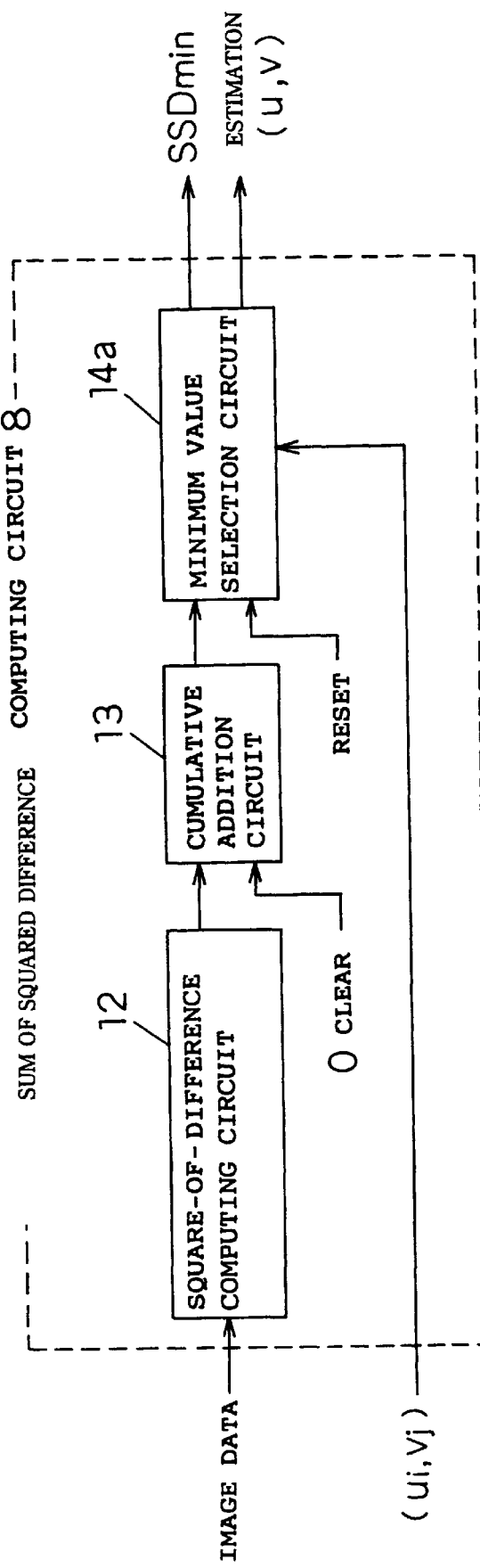
FIG. 4 is a block diagram of a sum-of-squared-difference computing circuit according to the first embodiment of the present invention.

FIG. 4 is a block diagram showing an example of the sum-of-squared-difference computing circuit 8. In FIG. 4, reference numeral 12 is a square-of-difference computing circuit, 13 is a cumulative addition circuit, and 14a is a minimum value selection circuit. The square-of-difference computing circuit 12 sequentially computes the differences in image data between the base block and the reference blocks. The cumulative addition circuit 13 is cleared to zero each time the sum of the squared difference between the base block and reference block is calculated; for each pixel in the base block and reference block, the output of the square-of-difference computing circuit 12 is cumulatively added, to calculate the sum of squared difference, SSD, shown in [Equation 1]. The minimum value selection circuit 14a is reset each time a new base block is set in the base image. Based on the SSDs calculated by the cumulative addition circuit 13 for all blocks (ui, vi) in the search area, the minimum value SSDmin of the SSDs and the error vector (u, v) between the coordinate value of the reference block that gives the smallest SSD and the coordinate value of the base block are updated within the search area, thereby computing the minimum value SSDmin of the SSDs within the search area and the estimate (u, v) in that region.

Figure 5:
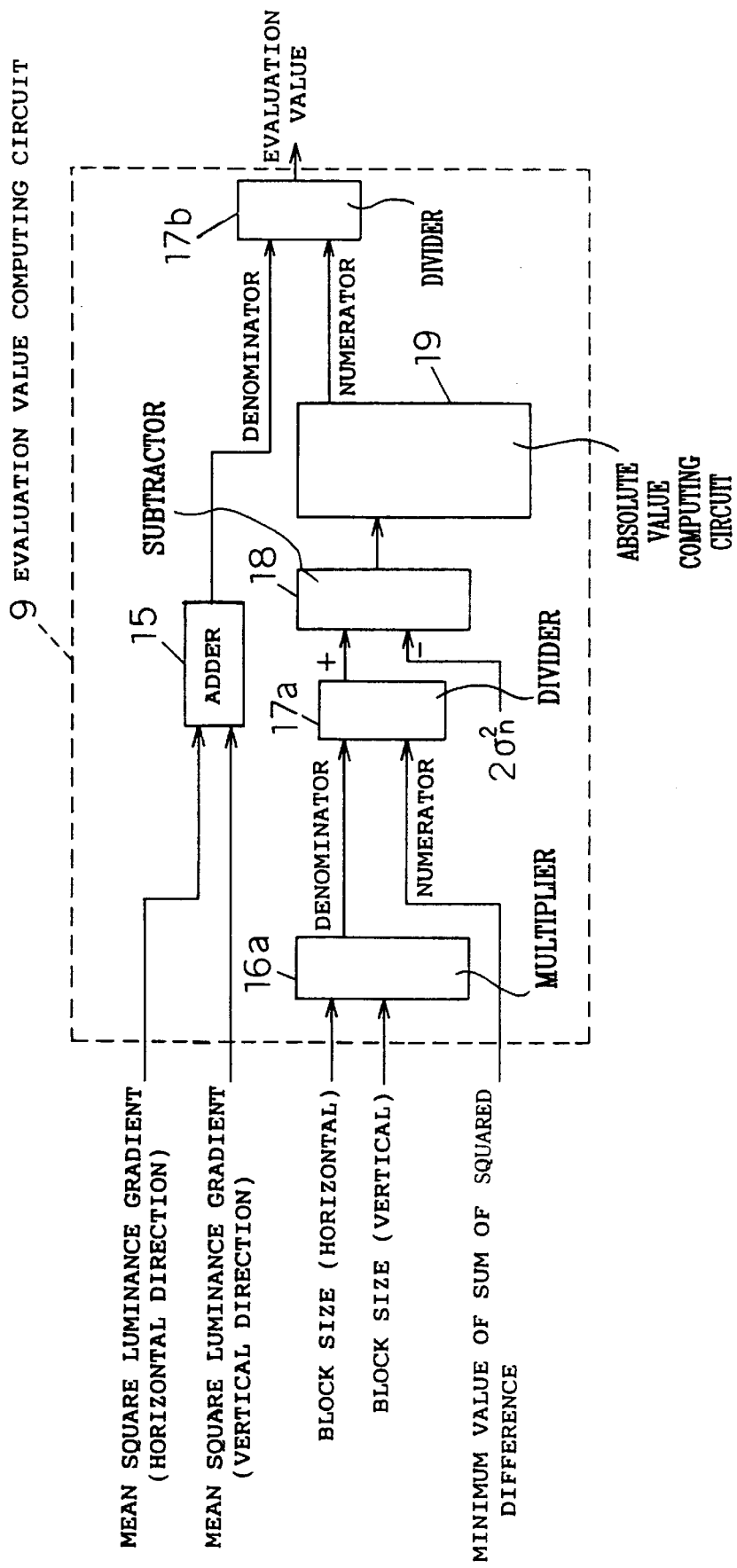
FIG. 5 is a block diagram of an evaluation value computing circuit according to the first embodiment of the present invention.

FIG. 5 is a block diagram showing an example of the evaluation value computing circuit 9. In FIG. 5, reference numeral 15 is an adder, 16a is a multiplier, 17a and 17b are dividers, 18 is a subtractor, and 19 is an absolute value computing circuit. The adder 15 adds the mean square luminance gradients in the horizontal and vertical directions, to calculate the denominator in [Equation 3]. The multiplier 16a multiplies the horizontal and vertical dimensions of the block size, to calculate the area N of the block. The divider 17a normalizes the minimum value of the sum of squared difference by the area of the block, to calculate the minimum value SSDmin/N of the sum of squared difference for each pixel. The subtractor 18 subtracts noise level from the minimum value of the sum of squared difference for each pixel. The absolute value computing circuit 19 computes the absolute value of the output of the subtractor 18. The divider 17b divides the output of the absolute value computing circuit 19 by the output of the adder 15, and outputs the evaluation value shown in [Equation 3].

Figure 6:
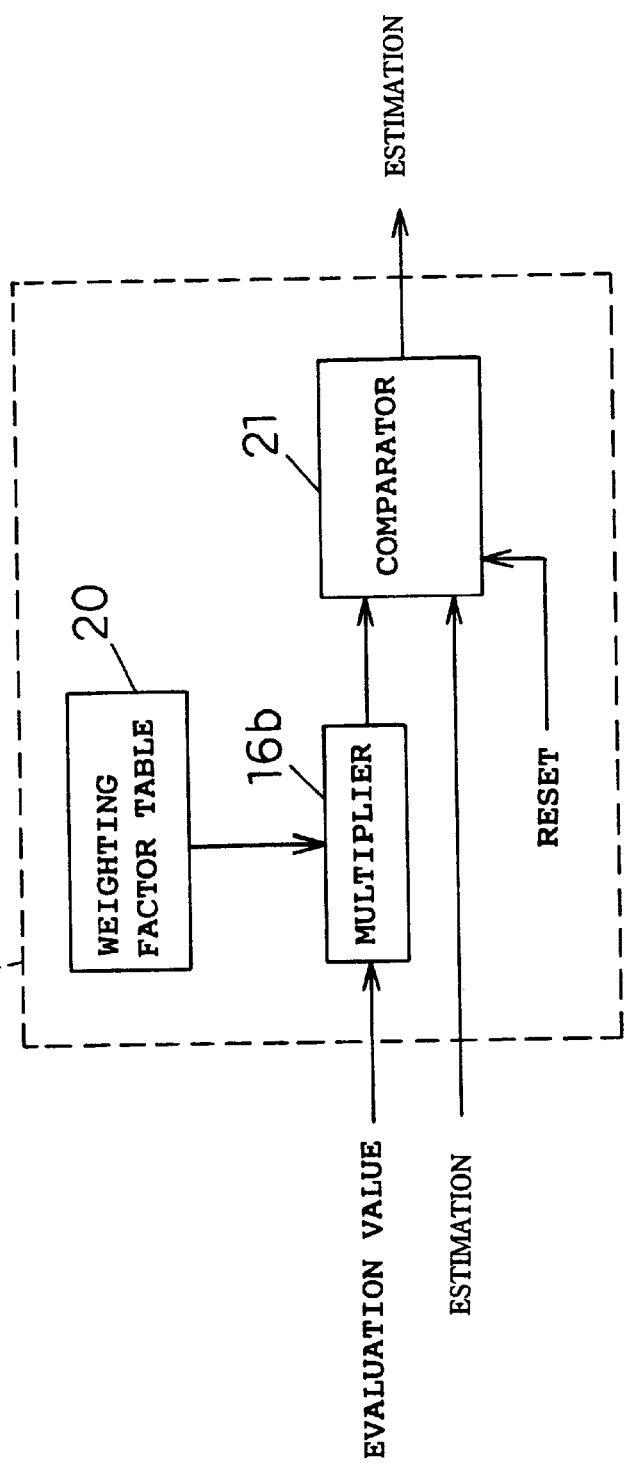
FIG. 6 is a block diagram of an estimation integrating computing circuit according to the first embodiment of the present invention.

FIG. 6 is a block diagram showing an example of the estimation integrating computing circuit 4. In FIG. 6, reference numeral 20 is a weighting factor table, 16b is a multiplier, and 21 is a comparator. The multiplier 16b sequentially reads confidence measure from the block correlation computing circuits 3A, 3B, 3C, and 3D, and multiplies each confidence measure by a weighting factor read from the weighting factor table 20 according to the block size. The comparator 21 is reset each time the base block is updated, and selects and outputs the estimate at the block size that gives the minimum evaluation value after weighting.

Figure 7:
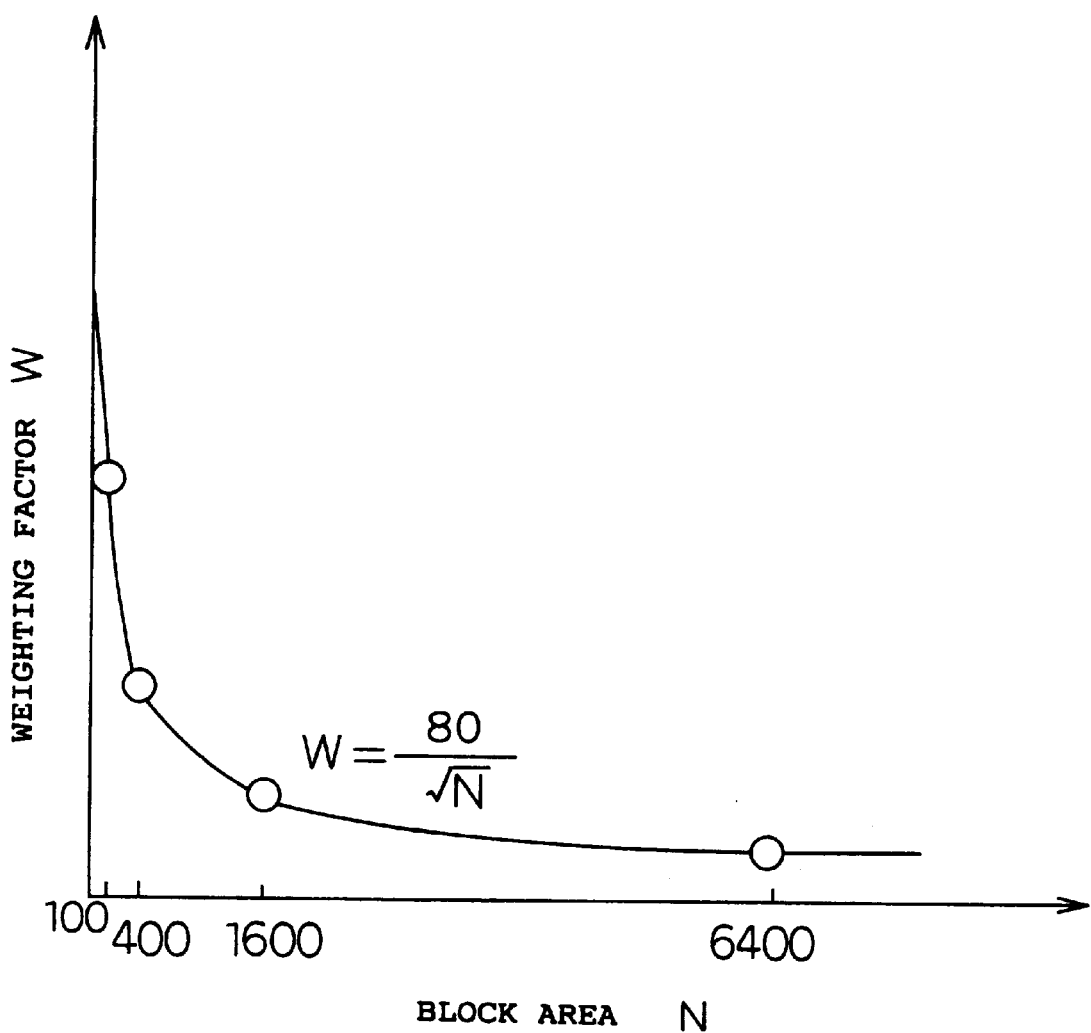
FIG. 7 is a characteristic diagram showing an example of the distribution of weighting factors in the estimation integrating computing circuit.

FIG. 7 shows an example of a characteristic curve plotting the weighting factor used in the estimation combining arithmetic circuit 4 versus the block area. In the example shown in FIG. 7, the characteristic is such that the weighting factor is proregional to the reciprocal of the square root of the block area.

As described, according to the present embodiment, the reliability of the result of estimation by block matching is evaluated based on the luminance gradient, image noise, minimum SSD, and block size, and the results of estimation obtained with different block sizes are integrated. Depth and motion can thus be estimated with good accuracy without performing iterative calculations.

The same effect can be obtained if the base image frame memory 1 and the reference image frame memory 2 in FIG. 1 are replaced by field memories. Such a modification is within the scope of the present invention. Furthermore, the block correlation computing circuits 3A, 3B, 3C, and 3D may be combined into a single block correlation computing circuit if block correlations can be computed at sufficiently high speeds with a single circuit. The weighting factor characteristic used in the estimation integrating computing circuit 4 is not limited to the example illustrated in the above embodiment; it will be appreciated that substantially the same effect can be obtained if the characteristic is such that the weighting factor is inversely proregional to the block area, for example. Such a modification is within the scope of the present invention.

Figure 26:
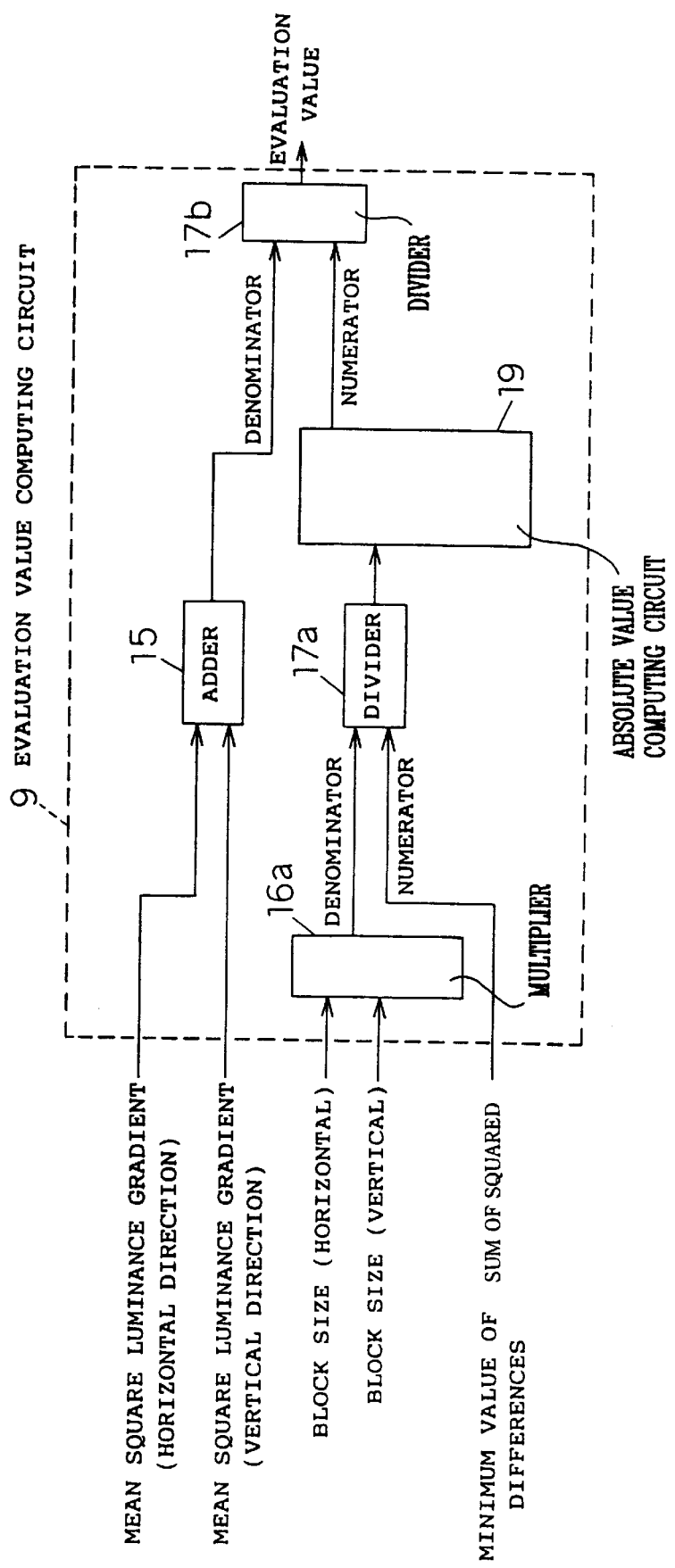
FIG. 26 is a block diagram showing a modified example of the evaluation value computing circuit according to the first embodiment of the present invention.

Furthermore, as a modification to the present embodiment, the subtractor 18 in FIG. 5 may be omitted, as shown in FIG. 26. Such a configuration does not take into account the effects of image noise but is effective when image noise is small.

(Embodiment 2)

Figure 8:
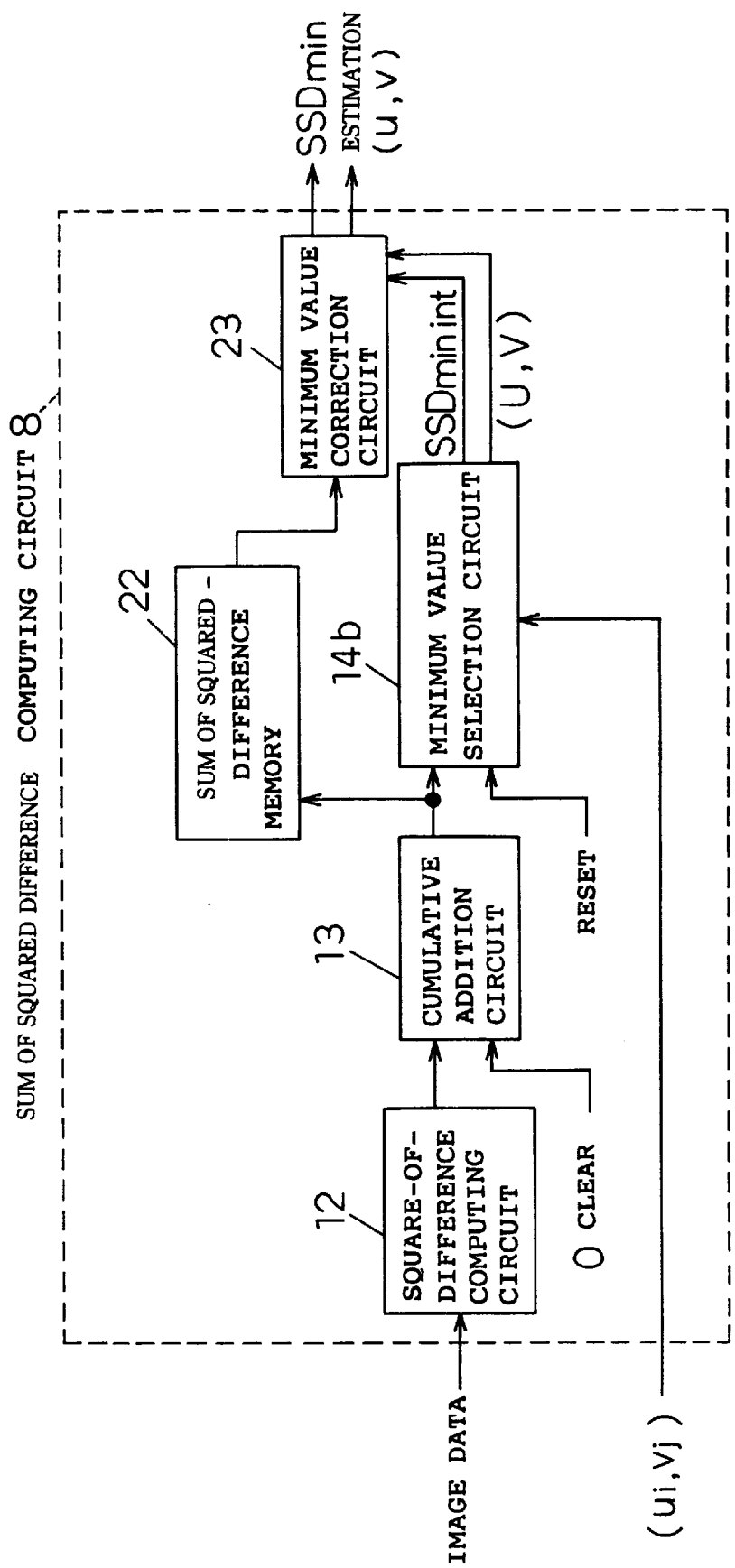
FIG. 8 is a block diagram of a sum-of-squared-difference computing circuit according to a second embodiment of the present invention.

FIG. 8 is a block diagram showing an example of a sum-of-squared-difference computing circuit according to a second embodiment of the present invention. In FIG. 8, reference numeral 12 is a square-of-difference computing circuit, 13 is a cumulative addition circuit, 14b is a minimum value selection circuit, 22 is a sum-of-squared-difference memory, and 23 is a minimum value correction circuit. In this configuration, the parts except the minimum value selection circuit 14b, sum-of-squared-difference memory 22, and minimum value correction circuit 23, are the same as those in the first embodiment, and the following description, therefore, deals only with the operation of the minimum value selection circuit 14b, sum-of-squared-difference memory 22, and minimum value correction circuit 23.

The minimum value selection circuit 14b is reset each time correlation computation is completed for one base block, that is, each time the cumulative addition circuit 13 finishes the calculation of [Equation 1] for all blocks (ui, vj) within the search area. The minimum value selection circuit 14b then selects the minimum value SSDminint of the sum of squared difference, SSD, calculated at one-pixel intervals by the cumulative addition circuit 13, and calculates the error vector (U, V), representing the difference between the coordinate values of the reference and base blocks, that gives the SSDminint. The sum-of-squared-difference memory 22 stores the values of the sums of square of differences, SSDs, calculated at one-pixel intervals by the cumulative addition circuit 13. Based on the error vector (U, V) selected by the minimum value selection circuit 14b, the minimum value correction circuit 23 reads the values of the sums of squared difference, SSDs, in the vicinity thereof (the values of the SSDs where the components of error vectors between the reference and base blocks are different within plus or minus one pixel from the error vector (U, V) that gives the minimum value SSDminint) from the sum-of-squared-difference memory 22, performs calculations for interpolation, and calculates the estimate and the minimum value of the sum of squared difference with subpixel accuracy.

Correction of the estimate is performed as follows: Using the minimum value of the sum of squared difference, calculated by [Equation 5] at one-pixel intervals, and its eight neighbors given as [Equation 6], first-order partial derivatives at (U, V) are calculated as [Equation 7], and second-order partial derivatives as [Equation 8]; then, the coordinates at which the partial derivatives are 0 are calculated by a first-order Taylor expansion as [Equation 9], the amount of correction (u, v) is obtained from [Equation 10], and the estimate (u, v) is calculated by [Equation 11].

$$SSDminint = SSD(U, V) \qquad \text{[Equation 5]}$$

$$SSD(U + i, V + j) \quad i = -1, 0, 1 \quad j = -1, 0, 1 \qquad \text{[Equation 6]}$$

$$\frac{\partial}{\partial x}SSD(U, V) = (SSD(U + 1, V - 1) - SSD(U - 1, V - 1) + \qquad \text{[Equation 7]}$$
$$SSD(U + 1, V) - SSD(U - 1, V) +$$
$$SSD(U + 1, V + 1) - SSD(U - 1, V + 1))/6$$

$$\frac{\partial}{\partial y}SSD(U, V) = (SSD(U - 1, V + 1) - SSD(U - 1, V - 1) +$$
$$SSD(U, V + 1) - SSD(U, V - 1) +$$
$$SSD(U + 1, V + 1) - SSD(U + 1, V - 1))/6$$

$$\frac{\partial^2}{\partial^2 x}SSD(U, V) = (SSD(U + 1, V - 1) - 2SSD(U, V - 1) + \qquad \text{[Equation 8]}$$
$$SSD(U - 1, V - 1) + SSD(U + 1, V) -$$
$$2SSD(U, V) + SSD(U - 1, V) + SSD(U + 1, V + 1) -$$
$$2SSD(U, V + 1) + SSD(U - 1, V + 1))/3$$

$$\frac{\partial^2}{\partial x \partial y}SSD(U, V) = \frac{\partial^2}{\partial y \partial x}SSD(U, V)$$
$$= (SSD(U + 1, V + 1) - SSD(U - 1, V + 1) -$$
$$SSD(U + 1, V - 1) + SSD(U - 1, V - 1))/4$$

$$\frac{\partial^2}{\partial^2 y}SSD(U, V) = (SSD(U - 1, V + 1) - 2SSD(U - 1, V) +$$
$$SSD(U - 1, V - 1) + SSD(U, V + 1) -$$
$$2SSD(U, V) + SSD(U, V - 1) + SSD(U + 1, V + 1) -$$
$$2SSD(U + 1, v) + SSD(U + 1, V - 1))/3$$

$$\frac{\partial}{\partial x}SSD(U + \Delta u, V + \Delta v) = \frac{\partial}{\partial x}SSD(U, V) + \frac{\partial^2}{\partial^2 x}SSD(U, V)\Delta u + \qquad \text{[Equation 9]}$$
$$\frac{\partial^2}{\partial y \partial x}SSD(U, V)\Delta v = 0$$

$$\frac{\partial}{\partial y}SSD(U + \Delta u, V + \Delta v) = \frac{\partial}{\partial y}SSD(U, V) + \frac{\partial^2}{\partial x \partial y}SSD(U, V)\Delta u +$$
$$\frac{\partial^2}{\partial^2 y}SSD(U, V)\Delta v = 0$$

$$\Delta u = \left(\frac{\partial}{\partial y}SSD(U, V)\frac{\partial^2}{\partial x \partial y}SSD(U, V) - \qquad \text{[Equation 10]}\right.$$
$$\left.\frac{\partial}{\partial x}SSD(U, V)\frac{\partial^2}{\partial^2 y}SSD(U, V)\right)/D$$

$$\Delta v = \left(\frac{\partial}{\partial x}SSD(U, V)\frac{\partial^2}{\partial x \partial y}SSD(U, V) - \right.$$
$$\left.\frac{\partial}{\partial y}SSD(U, V)\frac{\partial^2}{\partial^2 x}SSD(U, V)\right)/D$$

$$D = \frac{\partial^2}{\partial^2 x}SSD(U, V)\frac{\partial^2}{\partial^2 y}SSD - \left(\frac{\partial^2}{\partial x \partial y}SSD(U, V)\right)^2$$

$$u = U + \Delta u \qquad \text{[Equation 11]}$$
$$v = V + \Delta v$$

Then, the minimum value, SSD ($U+\Delta u$, $V+\Delta v$) of the SSD, for the estimate ($U+\Delta u$, $V+\Delta v$) with subpixel accuracy, is calculated as [Equation 12].

$$SSD(u, v) = SSD(U + \Delta u, V + \Delta v) \qquad \text{[Equation 12]}$$

-continued $$SSD(U, V) + \frac{\partial}{\partial x}SSD(U, V)\Delta u +$$
$$\frac{\partial}{\partial y}SSD(U, V)\Delta v$$

As described, according to the present embodiment, since the minimum value of the sum of squared difference calculated at one-pixel intervals is corrected by the gradients of the sums of squared difference in the vicinity thereof, the estimate can be calculated with subpixel accuracy.

It will also be appreciated that a similar effect can be obtained if the minimum value SSD (U, V) of SSD for the estimate (u, v) with subpixel accuracy is calculated as [Equation 13] using the mean square luminance gradient.

$$SSD(u, v) = SSD(U+\Delta u, V+\Delta v) = SSD(U, V) - \bar{fx}^2 \Delta u^2 - \bar{fy}^2 \Delta v^2$$ [Equation 13]

(Embodiment 3)

Figure 9:
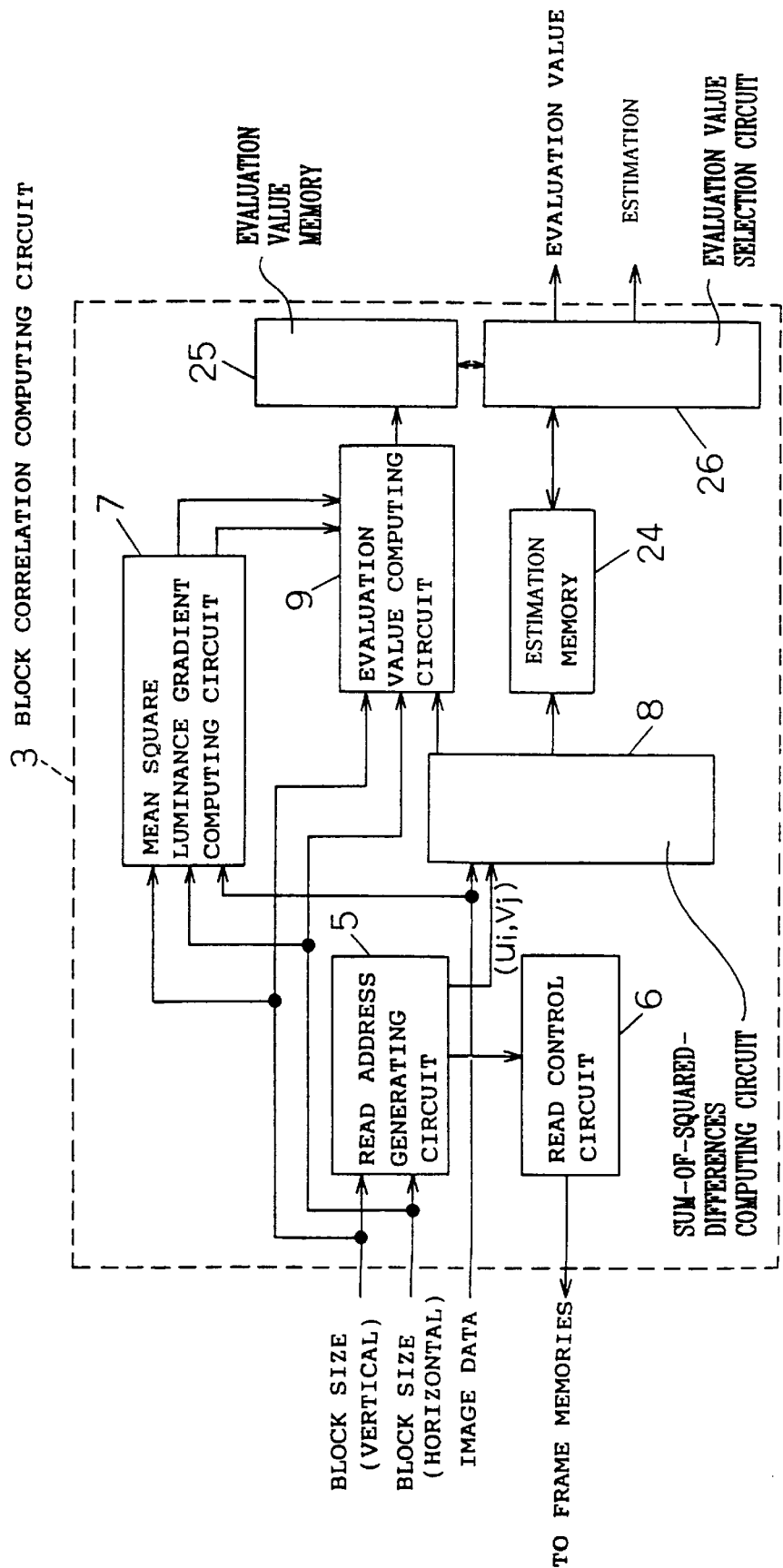
FIG. 9 is a block diagram of a block correlation computing circuit according to a third embodiment of the present invention.

FIG. 9 is a block diagram of a block correlation computing circuit according to a third embodiment of the present invention. In FIG. 9, reference numeral 5 is a read address generator, 6 is a read control circuit, 7 is a mean square luminance gradient computing circuit, 8 is a sum-of-squared-difference computing circuit, 9 is an evaluation value computing circuit, 24 is an estimate memory, 25 is an evaluation value memory, and 26 is an evaluation value selection circuit 26. In FIG. 9, the circuit operation, except that of the estimate memory 24, evaluation value memory 25, and evaluation value selection circuit 26, is the same as that described in the first and second embodiments of the invention. The following description, therefore, deals only with the operation of the estimate memory 24, evaluation value memory 25, and evaluation value selection circuit 26.

Figure 10:
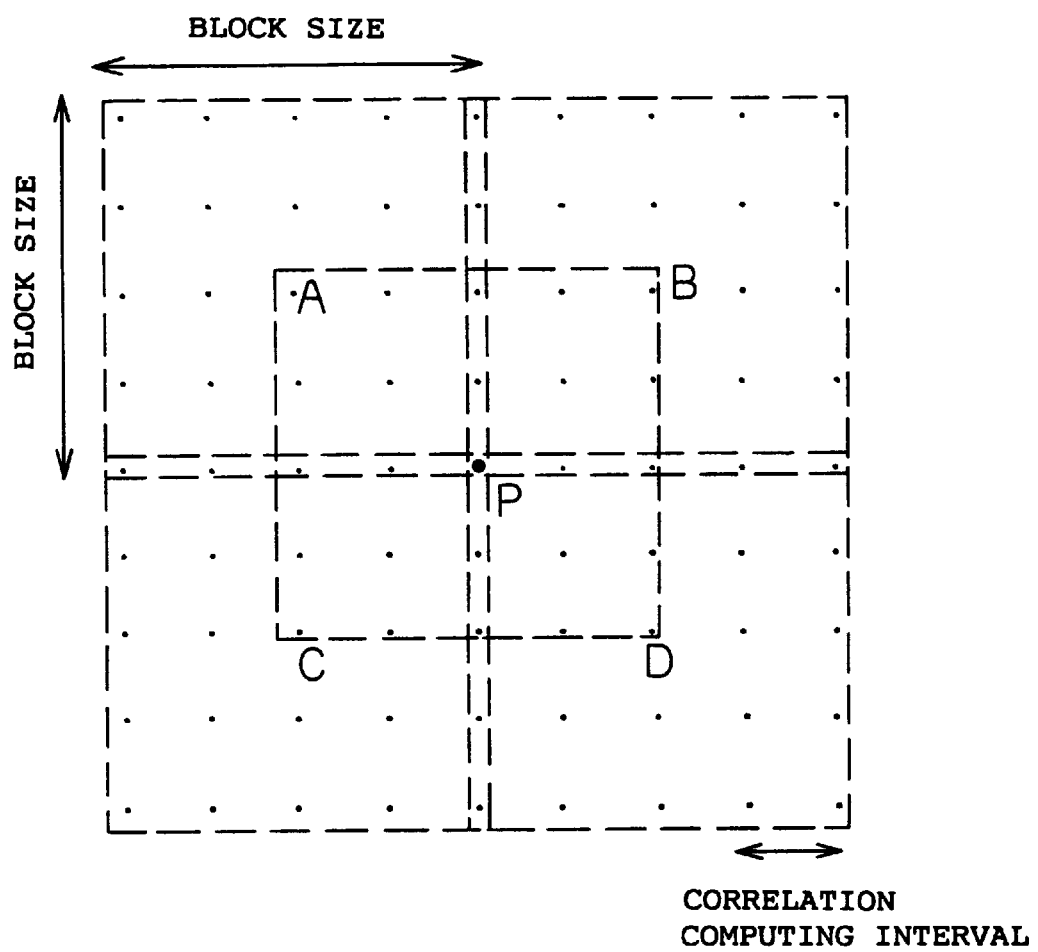
FIG. 10 is a diagram for explaining the selection of an evaluation value and an estimate in an evaluation selection circuit.

The estimate memory 24 stores values output from the sum-of-squared-difference computing circuit 8. The evaluation value memory 25 stores values output from the evaluation value computing circuit 9. The evaluation value selection circuit 26 compares an attention pixel with the evaluation values in its vicinity, and selects the estimate at the point that gives the best evaluation, and that evaluation value. FIG. 10 shows how the evaluation value selection circuit 26 selects the evaluation value and the estimate. In FIG. 10, P designates the attention pixel, each lattice point indicates the center point of a base block whose correlation is to be computed, and dashed lines show blocks with their centers at P, A, B, C, and D, respectively. For the evaluation value and estimate at the attention pixel P, the best evaluation value and the estimate that gives the best evaluation value are selected from the results of the correlation computations performed on all the blocks having their centers within the region enclosed by the dashed lines with its center at P (the results of the correlation computations performed on all the blocks with their centers at the lattice points within the region enclosed by the dashed lines with its center at P).

As described, according to the present embodiment, the evaluation value for the correspondence between images is obtained by selecting the best of the evaluation values calculated at intervals smaller than the block size in the vicinity of the attention pixel, and for the motion and depth estimation, the motion and depth estimation in the block that yielded the best evaluation value are selected. As a result, the change of the estimation in the regions where there are discontinuities in motion and depth estimation can be tracked with good precision.

In an alternative arrangement, when using a small block size, the correspondence between images is computed with the attention pixel set at the center of the block, and when using a large block size, the correspondence between images is computed in accordance with the evaluation value selection method of the present embodiment. This arrangement also ensures accurate tracking of the change of the estimation in the regions where there are discontinuities in motion and depth estimation, without departing from the scope of the present invention.

In a further alternative arrangement, when computing the correspondence between images using a small block size, the evaluation value selection method of the present embodiment is used and the attention pixel and the block center are adaptively displaced; when using a large block size, the correspondence between images is computed with the attention pixel set at the center of the block. This makes it possible to smoothly change the motion and depth estimation in hidden regions, without departing from the scope of the present invention.

(Embodiment 4)

Figure 11:
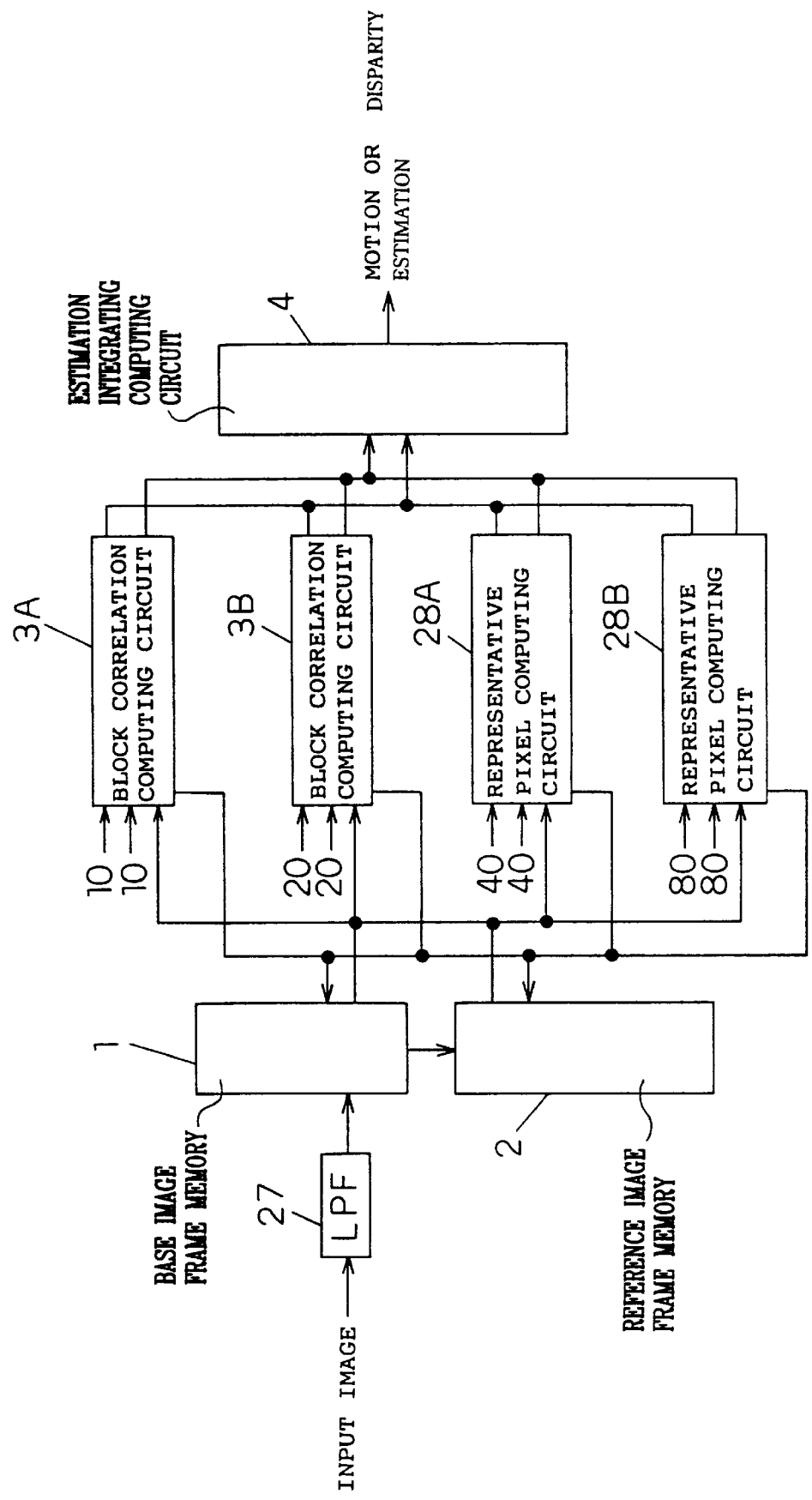
FIG. 11 is a block diagram of a motion and depth estimation apparatus according to a fourth embodiment of the present invention.

FIG. 11 is a block diagram of a motion and depth estimation apparatus according to a fourth embodiment of the present invention. In FIG. 11, reference numeral 27 is a low-pass filter, 1 is a base image frame memory, 2 is a reference image frame memory, 3A and 3B are block correlation computing circuits, 28A and 28B are representative pixel correlation computing circuits, and 4 is an estimation integrating computing circuit. These parts, except the low-pass filter 27 and the representative pixel correlation computing circuit 28A and 28B, are identical in operation to those in the first, second, and third embodiments, and therefore, the following description deals only with the operation of the low-pass filter 27 and the representative pixel correlation computing circuits 28.

The low-pass filter 27 limits the band of the input image so that the correlation computations in the representative pixel correlation computing circuits 28 will not be affected by repeat patterns. More specifically, when the representative pixels used for correlation computation in the representative pixel correlation computing circuits 28 are set at intervals of two pixels, the cutoff frequency of the low-pass filter 27 is set at 0.25 cycle/pixel (four pixels per cycle).

Figure 12:
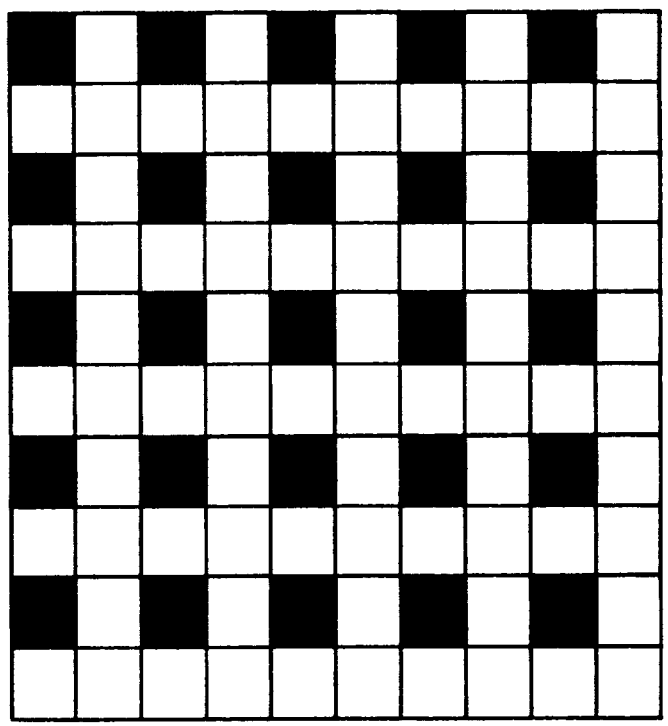
FIG. 12 is a diagram showing the arrangement of representative pixels within a block.

In the first, second, and third embodiments, correlation computation was performed by the block correlation computing circuits 3 on all pixels within a block; on the other hand, the representative pixel correlation computing circuits 28 in the fourth embodiment perform correlation computation only on the representative pixels within a block, as shown in FIG. 12.

Figure 13:
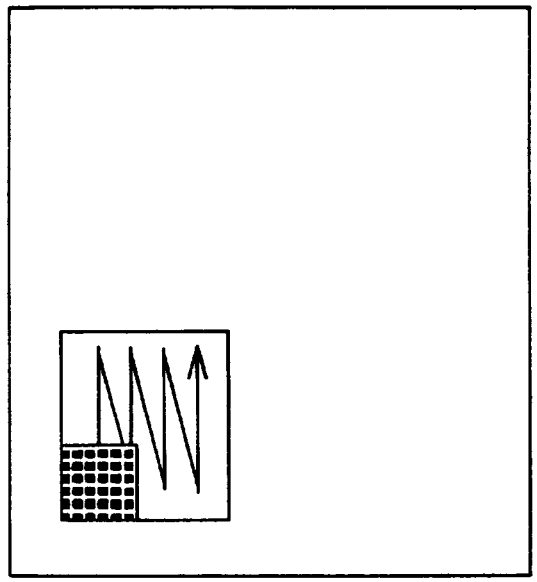
FIG. 13 is a diagram for explaining representative pixel correlation computation.
Figure 13:
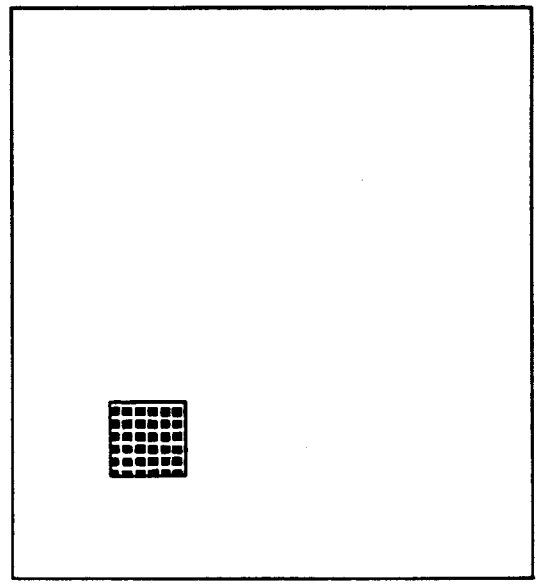

FIG. 12 shows an example in which the representative pixels are arranged at intervals of two pixels. Correlation computation is performed only on the pixels indicated by black squares within the search area, as shown in FIG. 13.

The representative pixel correlation computing circuits 28 each have the same configuration as that of the block correlation computing circuit 3 shown in FIG. 3, except that the read address generating circuit 5 in the present embodiment generates addresses at equal intervals of two or more pixels to perform correlation computation on the representative pixels.

If the representative pixels are set at intervals of two pixels for a block size of 40×40 and at intervals of four pixels for 80×80, estimation can be calculated with approximately the same accuracy as when correlation computation is performed on all pixels.

As described, according to the present embodiment, the amount of computation can be reduced for the computation of correlation when the block size is large, and the circuit complexity and computational cost can be reduced.

In the evaluation value selection method in any of the above embodiments, a similar effect can be obtained if the evaluation values are weighted according to the distance between the attention pixel and a neighboring block whose correlation is to be computed. Such an arrangement falls within the scope of the present invention. Further, in the evaluation equation for block correlation in any of the above embodiments, a similar effect can be obtained, without departing from the scope of the present invention, if the denominator of [Equation 3] is changed as shown in [Equation 14] or [Equation 15].

$$J=|SSD\mathrm{min}/N-2\sigma_n^2|/(\bar{fx}^2 \cdot \bar{fy}^2)^{1/2} \quad \text{[Equation 14]}$$

$$J=|SSD\mathrm{min}/N-2\sigma_n^2|/\mathrm{max}(\bar{fx}^2, \bar{fy}^2) \quad \text{[Equation 15]}$$

In any of the above embodiments, the yardstick for the evaluation of differences between blocks and the correlation confidence measure J are not limited to those expressed in [Equation 3] that uses the sum of squared difference SSD shown in [Equation 1], but it will be appreciated that a similar effect can be obtained if the confidence measure is calculated as [Equation 17] based on the sum of absolute differences SAD shown in [Equation 16].

$$SAD = \sum_{k,l \in W} |f2(x0+ui+k, y0+vj+1) - f1(x0+k, y0+1)| \quad \text{[Equation 16]}$$

$$J = |SAD\mathrm{min}/N - 2\sigma_n/\pi^{1/2}|/(|\bar{f}x| + |\bar{f}y|) \quad \text{[Equation 17]}$$

where SADmin is the minimum value of the SAD within the search area, $|\bar{f}x|$ is the mean absolute luminance gradient in the horizontal direction within the search area, and $|\bar{f}y|$ is the mean absolute luminance gradient in the vertical direction within the search area.

Further, a similar effect can be obtained, without departing from the scope of the present invention, if the denominator of [Equation 17] is changed as shown in [Equation 18] or [Equation 19].

$$J=|SAD\mathrm{min}/N-2\sigma_n/\pi^{1/2}|/(|\bar{fx}||\bar{fy}|)^{1/2} \quad \text{[Equation 18]}$$

$$J=|SAD\mathrm{min}/N-2\sigma_n/\pi^{1/2}|/\mathrm{max}(|\bar{fx}| \cdot |\bar{fy}|) \quad \text{[Equation 19]}$$

(Embodiment 5)

Figure 14:
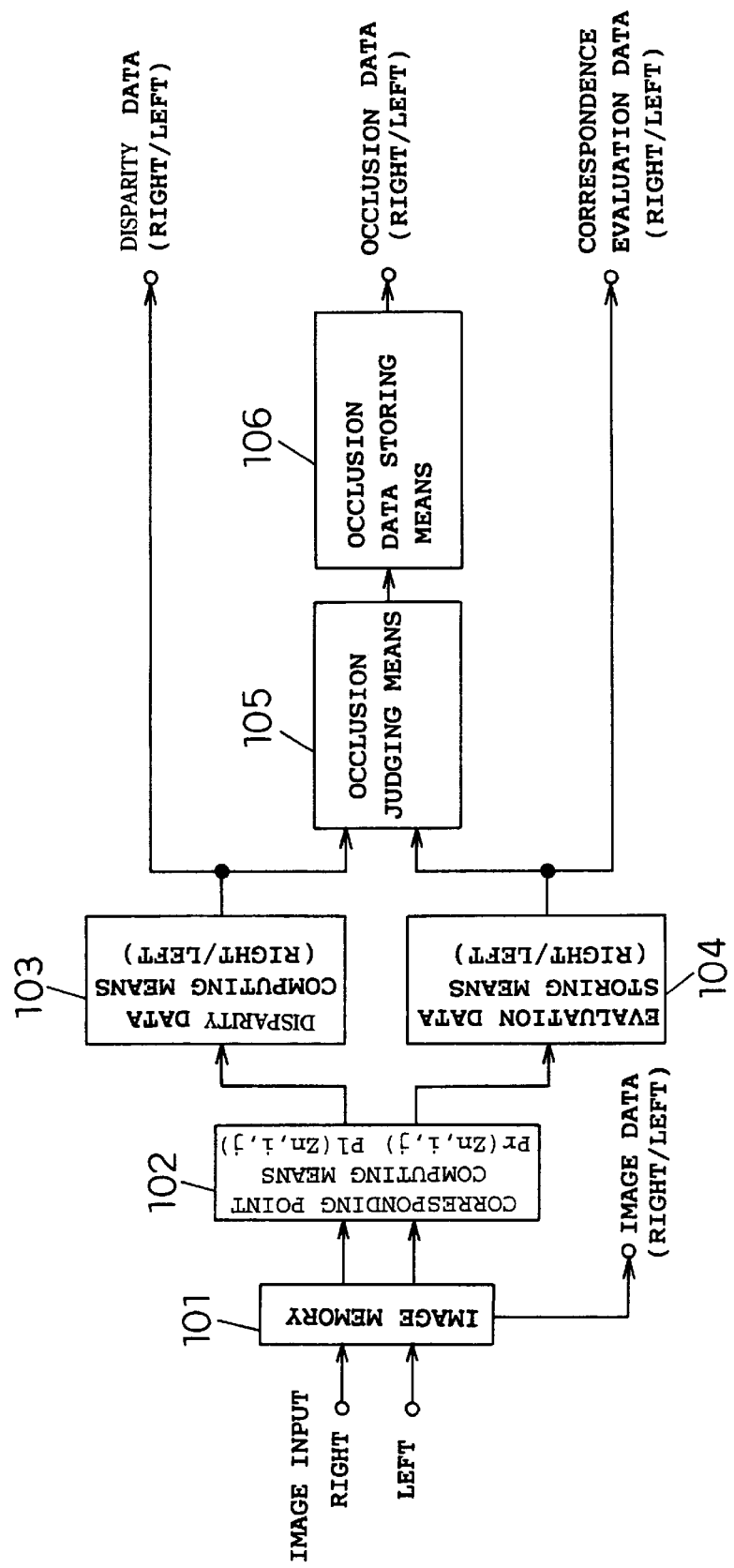
FIG. 14 is a diagram showing the first half of the configuration of a disparity computing apparatus according to a fifth embodiment of the present invention.
Figure 15:
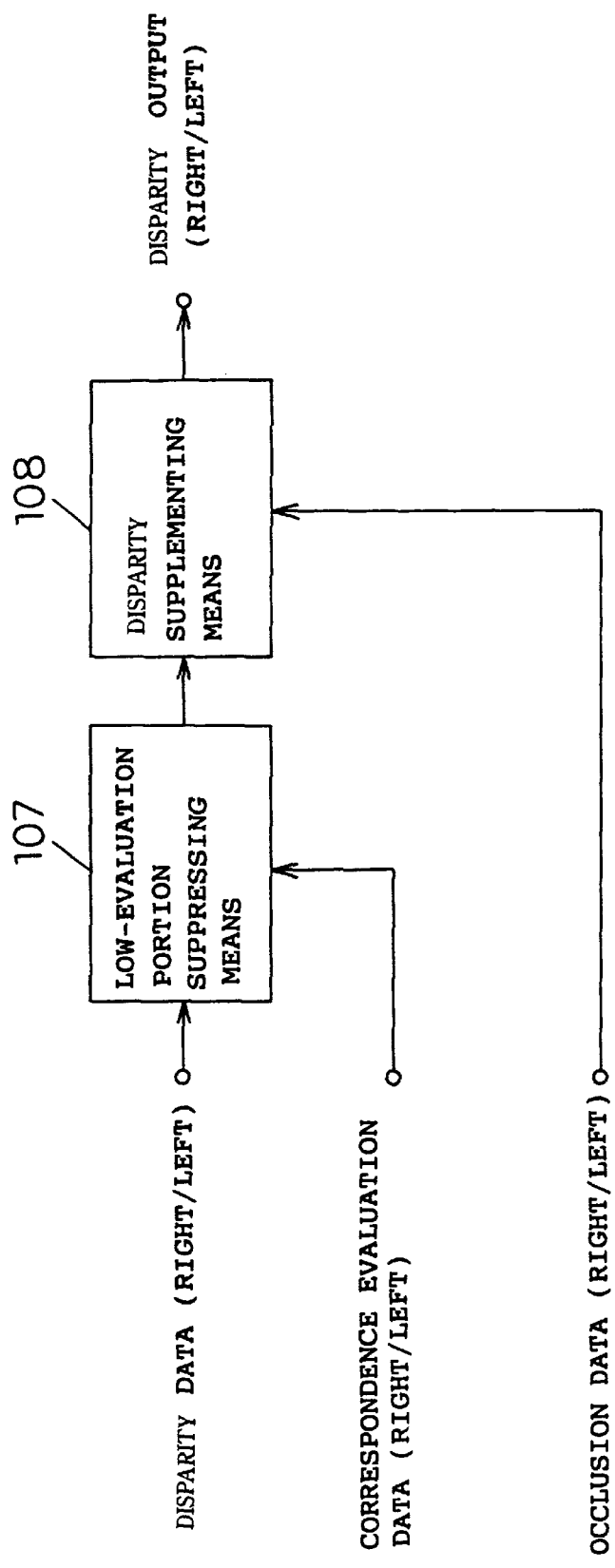
FIG. 15 is a diagram showing the second half of the configuration of the disparity computing apparatus according to the fifth embodiment of the present invention.

FIGS. 14 and 15 together show the configuration of a disparity computing apparatus according to a fifth embodiment of the present invention. In FIGS. 14 and 15, reference numeral 101 is an image memory for storing input images, 102 is a corresponding point computing means for computing the correspondence between images, 103 is a disparity data computing means for computing disparity data from the result of the computation of corresponding points, 104 is an evaluation data storing means for storing evaluation data for the computed disparity data, 105 is an occlusion judging means for performing occlusion judgement based on the disparity data and evaluation data, 106 is an occlusion data storing means for storing data that have been judged as occlusion, 107 is a low-evaluation region suppressing means for disabling disparity data for regions where evaluation data obtained are bad, and 108 is a disparity supplementing means for supplementing disparity for occlusion regions. The operation of the disparity computing apparatus of the above configuration will be described below.

Images captured by a stereo camera system having two cameras are input to the apparatus. Because of the difference between the two camera positions, the image data of objects closer to the camera shows a large displacement (corresponding to disparity), while that of distant objects shows a small displacement (disparity). These input images are first stored in the image memory 101, and the corresponding point computing means 102 performs the computation of corresponding points, an example of which is shown by [Equation 20].

$$Pr(Zn,i,j)=\Sigma|SR(X,Y)-SL(X+i,Y+j)| \text{ For } X, Y \in Zn \quad \text{[Equation 20]}$$

where SR and SL are signal values of the right-eye image and left-eye image, respectively, and X, Y are coordinate values within a correspondence computing region Zn. Further, Pr(Zn,i,j) is the evaluation value for the correspondence based on the right-eye image, and i,j is the disparity. The disparity data computing means 103 performs the calculation shown by [Equation 21] to obtain disparity Dsr(Zn) for a region Zn based on the right-eye image, and records the obtained data.

$$Dsr(Zn)=(i,j) \text{ for MIN}\{Pr(Zn,i,j)\} \quad \text{[Equation 21]}$$

Further, the value of Pr(Zn,i,j) for the disparity (i,j) is stored in the evaluation data storing means 104 as the evaluation value for the region Zn based on the right-eye image. For data based on the left-eye image, SR and SL are interchanged in [Equation 20], and the same calculations are performed as [Equation 22] and [Equation 23].

$$Pl(Zn,i,j)=\Sigma|SL(X,Y)-SR(X+i,Y+j)| \text{ For } X, Y \in Zn \quad \text{[Equation 22]}$$

$$Dsl(Zn)=(i,j) \text{ for MIN}\{Pl(Zn,i,j)\} \quad \text{[Equation 23]}$$

Figure 16A:
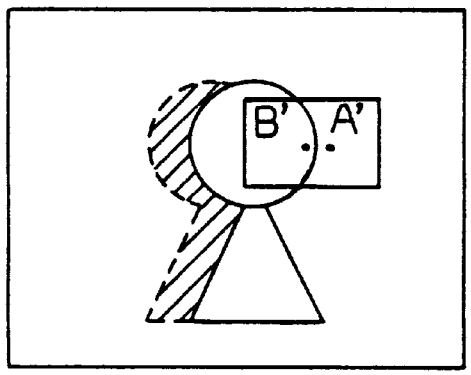
FIGS. 16 (a) to 16 (d) are diagrams for explaining a method of occlusion detection according to the disparity computing apparatus of the present invention.
Figure 16B:
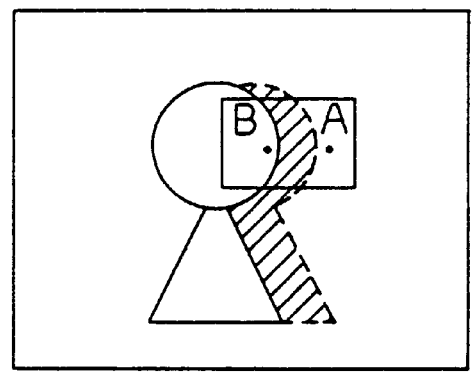
Figure 16C:
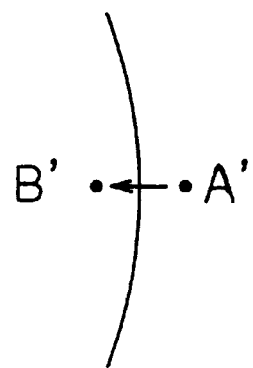
Figure 16D:
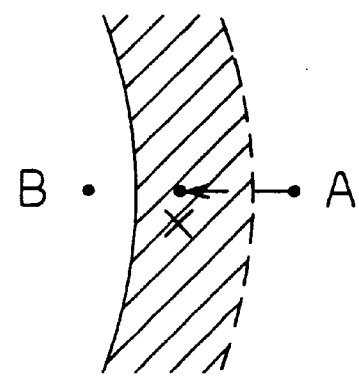

Using the thus obtained disparity data and evaluation data based on the right-eye and left-eye images, the occlusion judging means 105 performs the following occlusion judgement. The method of occlusion judgement will be described with reference to FIG. 16. FIGS. 16(a) to 16(d) shows a left-eye image, FIG. 16(b) a right-eye image, and FIGS. 16(c) and 16(d) are enlarged views of regions of FIGS. 16(a) and 16(b), respectively. Oblique hatching in FIG. 16 shows the regions where there are no corresponding points between the left- and right-eye images because of occlusion, and therefore, corresponding points cannot be calculated correctly. Point A in the right-eye image corresponds to point A' in the left-eye image; likewise, point B in the right-eye image corresponds to point B' in the left-eye image. In performing the occlusion judgement, point X, which is displaced to the left (or to the right) by a given number of pixels from point A where correspondence is correctly obtained and the evaluation based on the right-eye image is good (the evaluation value is small in this example), is found, and the evaluation value based on the right-eye image is examined at point X (the distance AX is approximately equal to the horizontal dimension of the region Zn); if the evaluation is bad (in this example, the evaluation value is large), a point corresponding to point A that yields good evaluation is examined and this point is taken as A' (the corresponding point is in the left-eye image). Next, the evaluation value based on the left-eye image is examined at point B' displaced to the left (in the direction from point A to point X) by a given number of pixels from point A' in the left-eye image. If the evaluation at point B' is bad, then it is judged that the computation of correspondence between the left- and right-eye images cannot be performed (because, for example, there is very little change in image level). On the other hand, if the evaluation at B' is good, point B (in right-eye image) corresponding to B' is examined, and distances AB and A'B' in the respective images are obtained. If distance AB−distance A'B' is larger than a predetermined value, the region between A and B is judged to be an occlusion region. For the left-eye image, the left and right relationship is inverted to perform the judgement.

Figure 17A:
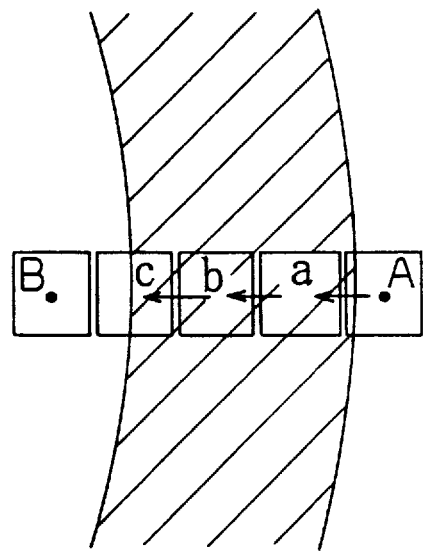
FIGS. 17 (a) and 17 (b) are diagrams for explaining disparity and a method of disparity supplementation according to the disparity computing apparatus of the present invention.
Figure 17B:
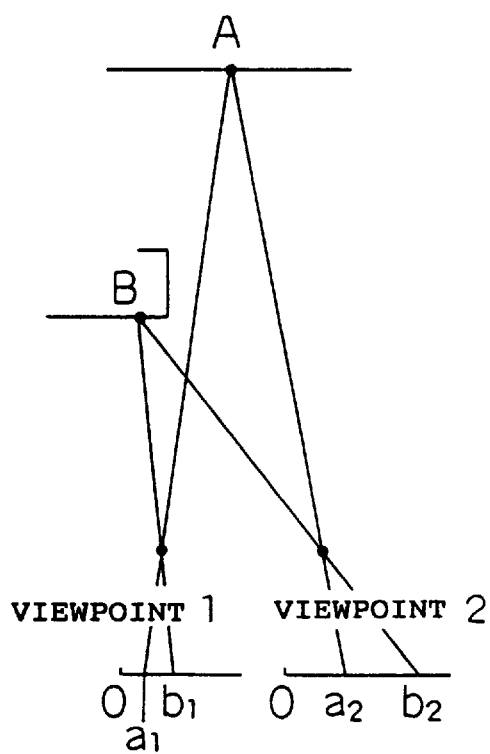

The above occlusion judgement is performed in the occlusion judging means 105, and the result of the judgement is stored in the occlusion data storing means 106. Next, based on the disparity data and evaluation data, the low-evaluation region suppressing means 107 performs an operation to remove the disparity data whose evaluation value is lower than a predetermined level (evaluation is bad) by rendering such data uncertain. After removing regions whose correspondence relations are uncertain, the disparity of the occlusion region is supplemented by the disparity supplementing means 108. The method of disparity supplementation will be described with reference to FIGS. 17(a) and 17(b). Oblique hatching in FIG. 17(a) shows the occlusion region. Points A and B on both sides of the occlusion region are the points where the evaluation value for correspondence is good and for which stable disparity has been calculated. In the disparity data based on the right-eye image, if the disparity at the right is smaller than the disparity at the left (that is, the object at the right is at a longer distance than the object at the left, the disparity of point A being a2-a1 and that of point B b2-b1, as shown in FIG. 17(b)), occlusion occurs. Therefore, disparity data supplementation based on the right-eye image is performed proceeding from right to left, using the disparity data on the right-hand side. More specifically, disparity data is added starting at point A and proceeding in the order of a, b, and c until reaching point B where stable disparity has been obtained. When supplementing disparity data based on the left-eye image, the process proceeds from the left to the right of the occlusion region. Between the left- and right-eye images, the supplementing process is fundamentally the same, except that the left and right directions are inverted. By this disparity supplementation, disparity that is estimated to be a correct disparity can be added for regions where correct correspondence cannot be established and disparity cannot be obtained because of occlusion.

If there is a region that is judged to be a region with uncertain correspondence (for example, a region where there is very little change in image level), though not an occlusion region, disparity data for that region is interpolated using the disparity data for regions lying on the both sides of that region and where stable correspondence is established (regions with good evaluation value). Interpolation is performed by first-order or second-order approximation. This interpolation operation is performed by the disparity supplementing means 108.

As described, according to the fifth embodiment, based on regions where correspondence between the left- and right-eye images is correctly established, regions where no correspondence is available between the left- and right-eye images because of occlusion by an object can be obtained correctly, and further, the disparity that is estimated to be correct from the relationship with the occlusion by the object can be added for such uncertain regions. The practical advantage offered by this embodiment is enormous.

(Embodiment 6)

Figure 18:
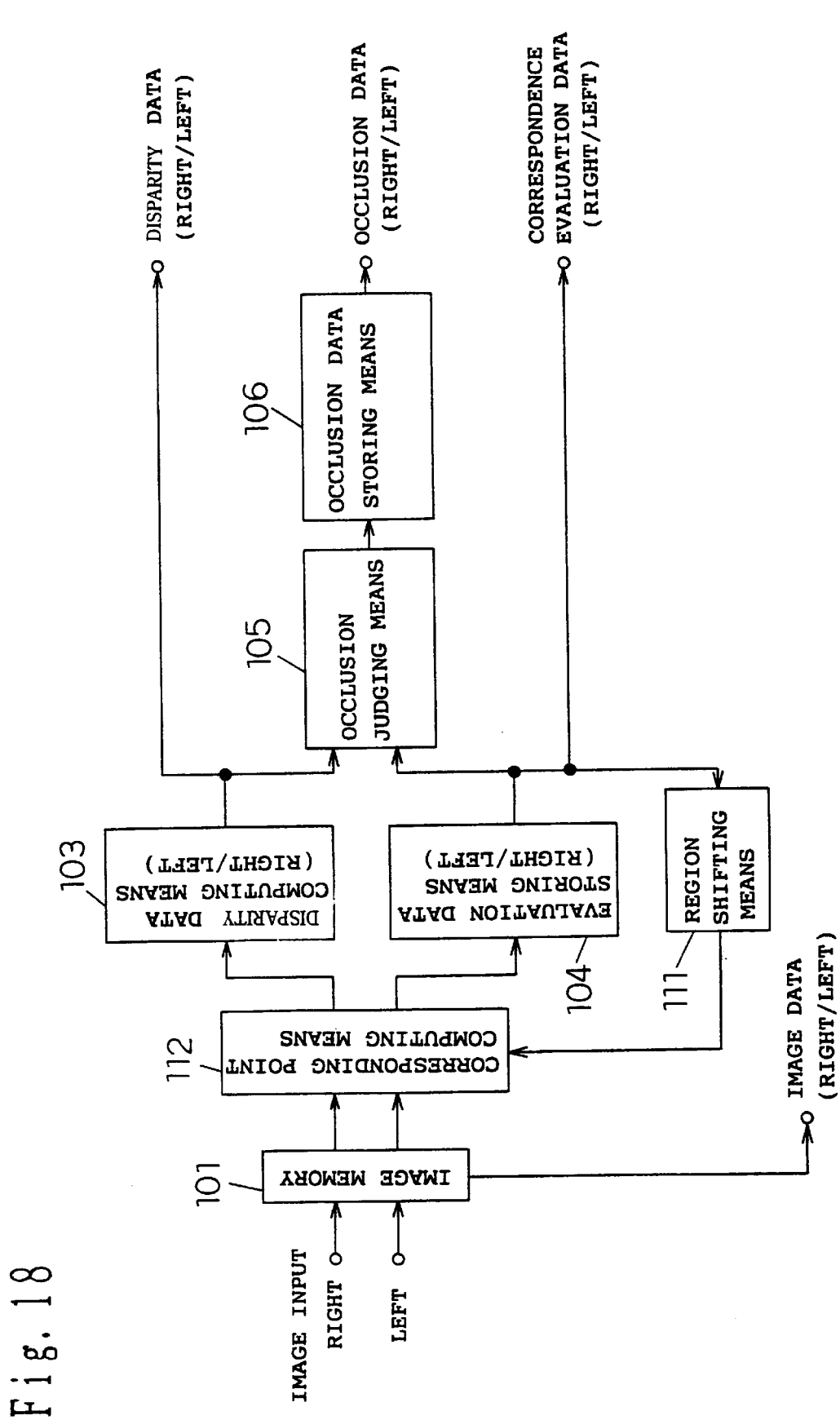
FIG. 18 is a diagram showing the first half of the configuration of a disparity computing apparatus according to a sixth embodiment of the present invention.

Next, a sixth embodiment of the present invention will be described which is concerned with an improvement on the corresponding point computing method of the fifth embodiment. FIG. 18 shows the first half section of the configuration, the second half section being the same as that of fifth embodiment shown in FIG. 5. The same parts as those in the fifth embodiment are designated by the same reference numerals, and description of such parts will not be repeated here. The differences from the fifth embodiment are in a region shifting means 111 and a corresponding point computing means 112.

Figure 19A:
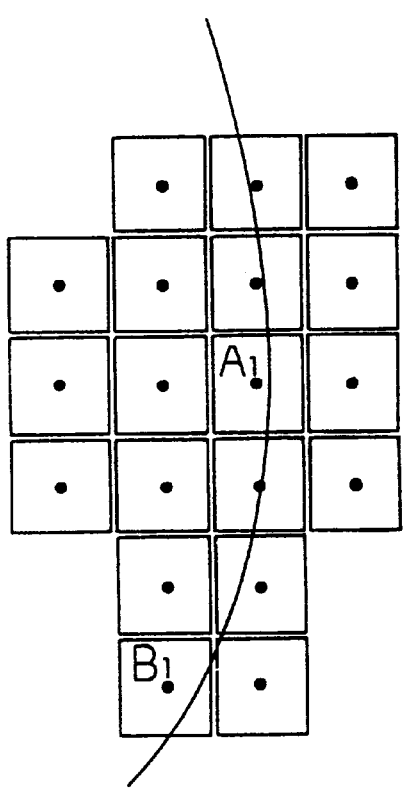
FIGS. 19 (a) and 19 (b) are diagrams for explaining computing regions at a disparity edge according to the disparity computing apparatus of the present invention.
Figure 19B:
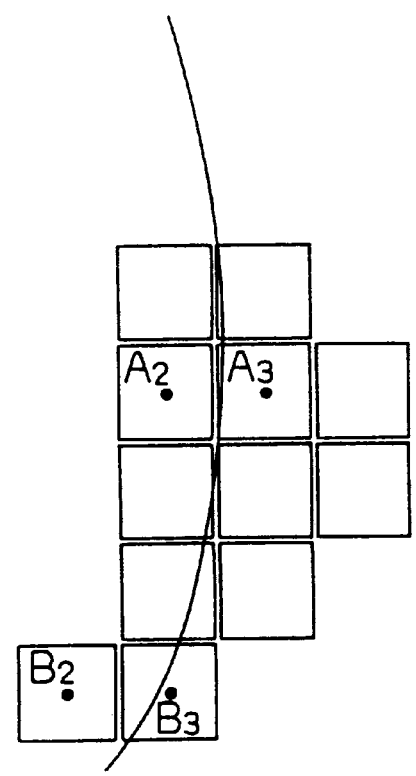

The operation of the sixth embodiment will be described below. The process is the same as that in the fifth embodiment up to the step where the images are stored in the image memory 101 and the disparity data and evaluation data are calculated. Then, based on the evaluation data of the obtained corresponding points, the region shifting means 111 shifts the corresponding point computing region (Zn in [Equation 20]) both to the right and to the left by a half cycle for low evaluation regions, and performs control so that the computation of corresponding points will be performed on the two computing regions thus shifted. The computation of corresponding points is performed in the corresponding point computing means 112. If there are several computing points in succession, this means that computation is performed by shifting the computing region by 180 degrees from the initial position. By shifting the computing region Zn by a half cycle in this manner, a computing region A1 crossing a disparity edge is shifted to positions A2 and A3, substantially avoiding crossing the disparity edge, as shown in FIGS. 19(a) and 19(b). In any computing region (for example, A2) that does not cross the disparity edge, there is no substantial disparity change within that region, so that correspondence with good evaluation can be obtained. Likewise, shifting a computing region B1 by a half cycle results in regions B2 and B3; in this case, the evaluation value for the region B2 that does not contain the disparity boundary can be improved. After improving the evaluation values for regions corresponding to the disparity edge in this manner, the same processing, from the occlusion judging means 105 to the disparity supplementing means 108, as in the fifth embodiment, is performed to obtain final disparity.

As described, according to the sixth embodiment of the invention, disparity computation for regions near the disparity boundary can be performed with higher accuracy than in the fifth embodiment, and the disparity can be estimated more correctly. The resulting practical advantage is enormous.

(Embodiment 7)

Figure 20:
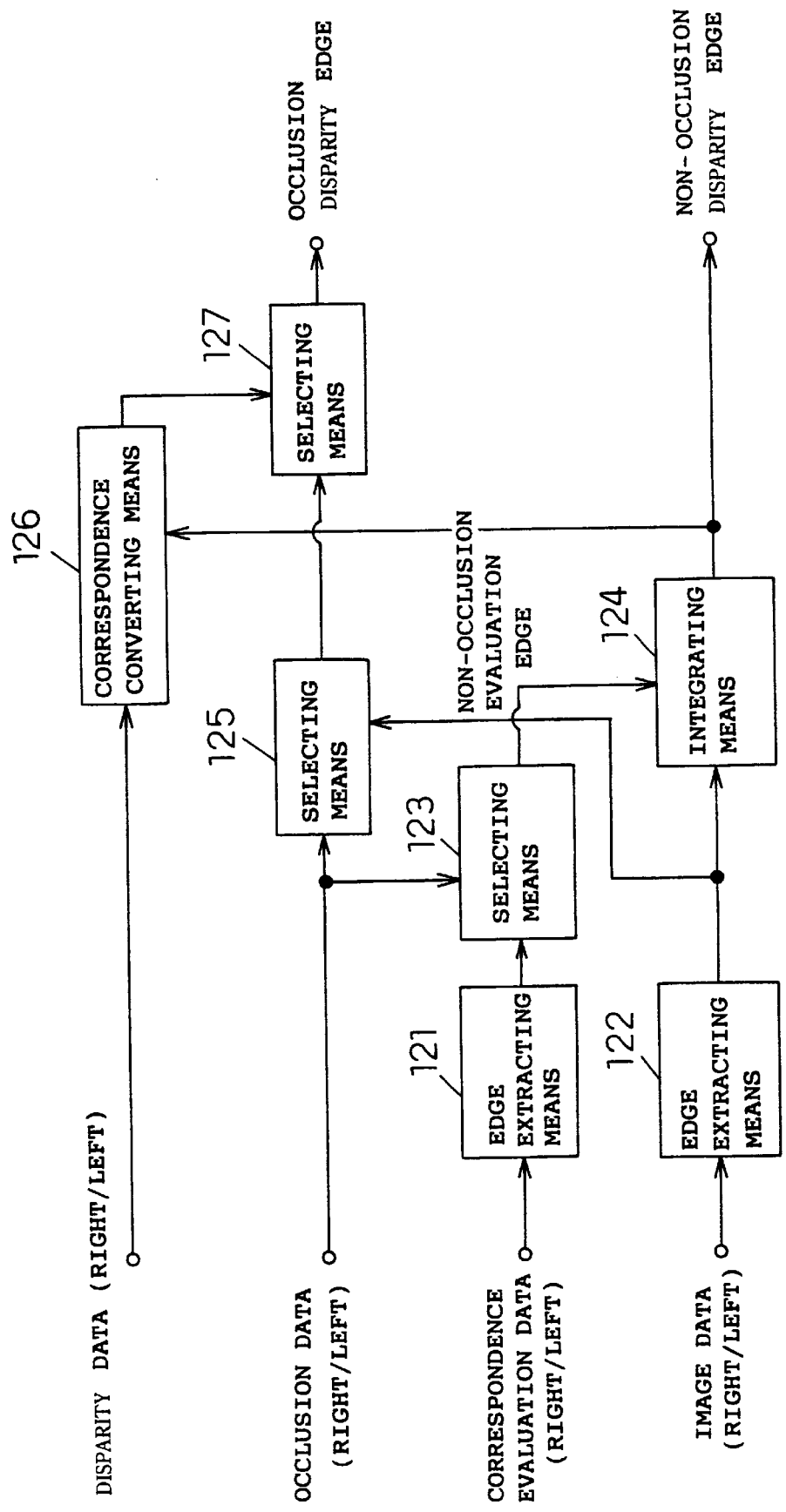
FIG. 20 is a diagram showing the first half of the configuration of a disparity computing apparatus according to a seventh embodiment of the present invention.
Figure 21:
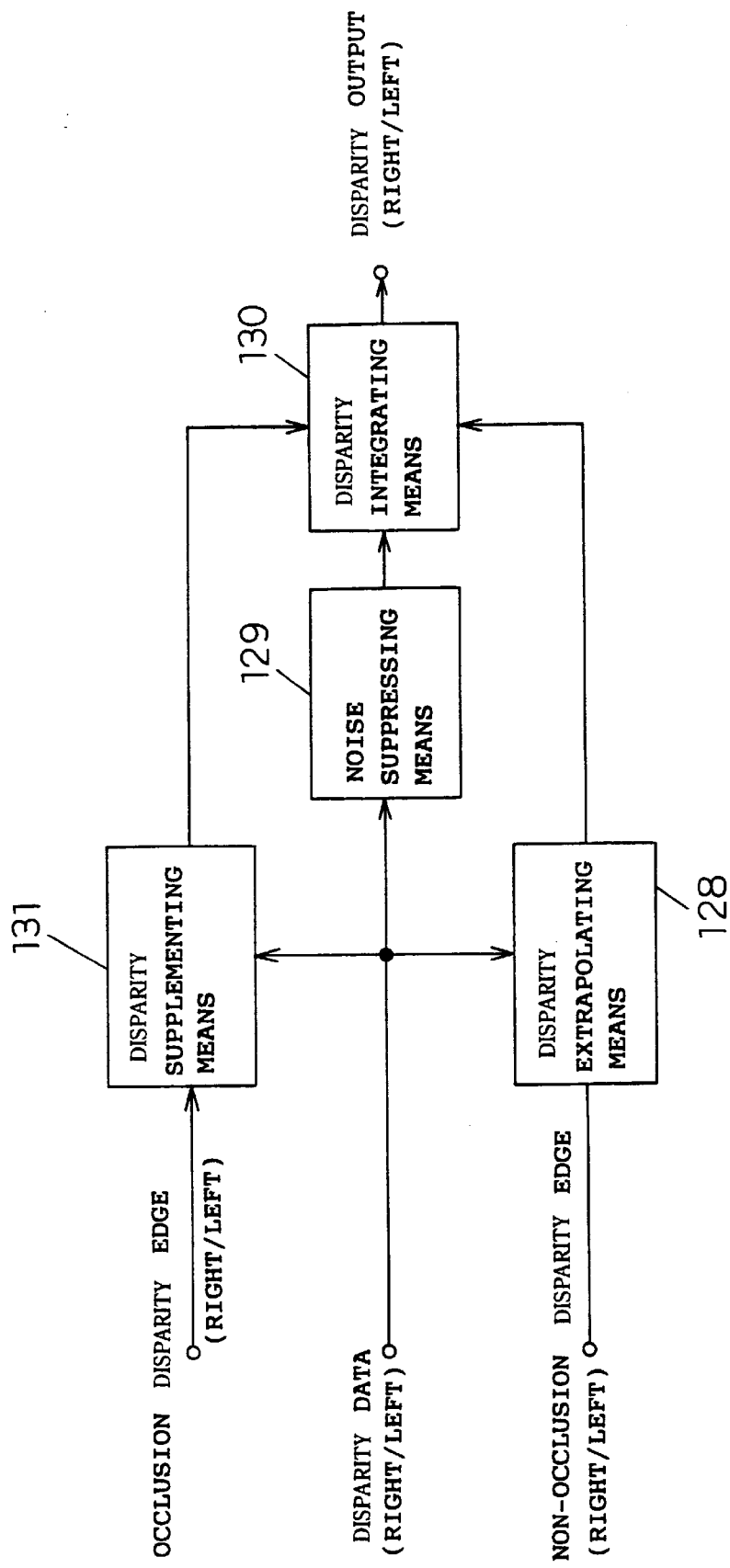
FIG. 21 is a diagram showing the second half of the configuration of the disparity computing apparatus according to the seventh embodiment of the present invention.

Next, a seventh embodiment of the present invention will be described which is concerned with a method of computation at the disparity boundary and occlusion boundary described in the fifth and sixth embodiments. FIGS. 20 and 21 together show the second half of the configuration of the present embodiment, the first half being the same as that of the fifth embodiment shown in FIG. 14. The same parts as those in the fifth embodiment are designated by the same reference numerals, and description of such parts will not be repeated here. The difference from the fifth embodiment is the addition of: edge extracting means 121 and 122; selecting means 123, 125, and 127; integrating means 124; correspondence converting means 126; disparity extrapolating means 128; noise suppressing means 129; disparity integrating means 130; and disparity supplementing means 131.

The operation of the seventh embodiment will be described below. Images are stored in the image memory 101 and disparity data and occlusion data are computed in the same manner as in the fifth and sixth embodiments. For the thus obtained evaluation data and the image data, the edge extracting means 121 and 122 compute edges of the respective data. Next, of the edge of the evaluation data, a region not included in an occlusion region is selected by the selecting means 123, and the image edge and the evaluation data edge of the non-occlusion region are integrated by the integrating means 124. In one example of the integration method, the absolute values of the edge components are obtained and the average level is chosen as the edge intensity. The product of the edge intensities is taken as the integration level, and those having an integration level greater than a predetermined value are selected and integrated to obtain disparity edge. The disparity edge does not include occlusion regions but corresponds to the image edge. Next, of the image edge, a region included in the occlusion region is selected by the selecting means 125. On the other hand, the vicinity of the edge of the corresponding image (the right-eye image if the disparity (image) edge of the non-occlusion region is based on the left-eye image, or the opposite), corresponding to the vicinity of the disparity (image) edge of the non-occlusion region, is obtained by the correspondence converting means 126 using the disparity data (the data indicating the correspondence between the left- and right-eye images).

The method of obtaining the disparity edge of a occlusion region will be described below with reference to FIG. 16. The disparity edge and image edge extracted by the integrating means 124 correspond to the region sandwiched between A' and B'. Using this data plus the disparity data, the correspondence converting means 126 outputs regions in the vicinity of A and B in the corresponding image. Next, the selecting means 125 outputs an image edge of the occlusion region (the edge immediately to the right of B); this output and the region of the output of the correspondence converting means 126 that is output simultaneously with the output of the selecting means 125 are selected by the selecting means 127, which outputs the disparity edge and image edge in the vicinity of B. In this manner, based on the disparity edge and image edge of the non-occlusion region, the selecting means 127 selects the disparity edge and image edge included in the occlusion region in the corresponding image, and outputs the selected edge as the disparity edge of the occlusion region.

Figure 22A:
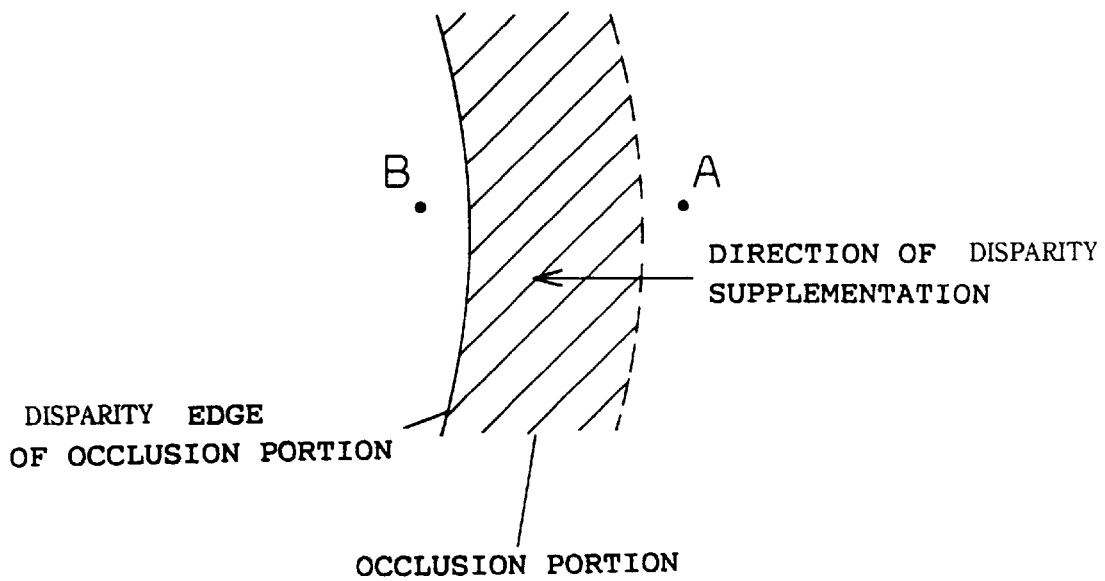
FIGS. 22 (a) and 22 (b) are diagrams for explaining disparity supplementation and disparity extrapolation performed in the disparity computing apparatus according to the seventh embodiment of the present invention.
Figure 22B:
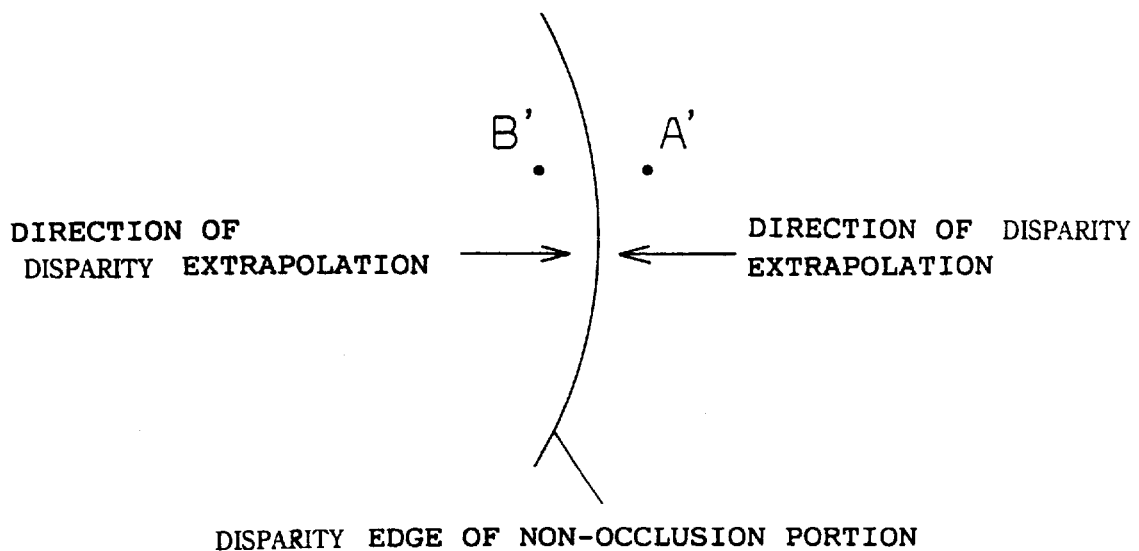

After stably obtaining the disparity edges of the non-occlusion region and occlusion region from the regions where the correspondence between the left- and right-eye images are established, disparity supplementation and disparity extrapolation are performed. The method of disparity supplementation and disparity extrapolation will be described with reference to FIGS. 22(*a*) and 22(*b* ). FIG. 22(*a*) shows the disparity based on the right-eye image, and FIG. 22(*b*) shows the disparity based on the left-eye image. When the disparity data is based on the right-eye image (FIG. 22(*a*)), disparity supplementation for the occlusion region is performed progressing from right to left. Parallax data for the occlusion region is added using the disparity data on the right-hand side of the occlusion region. Point A in FIG. 22(*a*), lying on the right-hand side of the occlusion region, provides a good (small) evaluation value, and has a stable and correct corresponding point (point A'). Starting at point A, data supplementation is performed until reaching the disparity edge obtained stably by the above method. When supplementing the disparity based on the left-eye image, supplementation is performed progressing from the left to the right of the occlusion region. Between the left- and right-eye images, the supplementing process is fundamentally the same, except that the left and right directions are inverted. This disparity supplementation is performed by the disparity supplementing means 131. On the other hand, the disparity extrapolating means 128 extrapolates the disparity to the disparity edge of the non-occlusion region from the stable disparities at the right and left (points A' and B'), as shown in FIG. 22(*b*). Parallax data other than the disparity edges is fed into the noise suppressing means 129 where the disparity data is median-filtered to remove the disparity components having different values from the neighboring disparity.

In the median filtering, the average of two medians of the disparity data of the center and its eight neighbors is used. When the evaluation value is bad and there are not enough data terms, if the number of data terms is odd, the median data is output, and if there are an even number, the average of the two medians is output. When the number of data terms is less than four, median filtering is not performed. The disparity data with disparity noise components suppressed, the disparity data supplemented for the occlusion region, and the disparity data with disparity extrapolated at the disparity edge are integrated by the disparity integrating means 130. Parallax integration is performed by first adopting data that is neither the disparity edge region and the occlusion region, then the data of the disparity edge region, and finally the data of the occlusion region. In this manner, correspondence between two images (a plurality of images) is examined, from which the disparity is computed.

As described, the disparity edge of the non-occlusion region is obtained which can be obtained stably from the image data and the evaluation data of the correspondence between the left- and right-eye images. Then, the disparity edge of the occlusion region is obtained from the image edge of the occlusion region and the vicinity of the disparity edge in the corresponding image, corresponding to the vicinity of the disparity edge of the non-occlusion region. In this manner, the disparity and the disparity edge are first obtained from occlusion-free regions where data can be stably computed, and then the disparity edge of the occlusion region is obtained. Using the thus obtained disparity edge and the disparity edge of the occlusion region, disparityes of the regions where disparityes have not been obtained stably are supplemented or extrapolated, thus computing as accurate disparity as possible from the two (or more) images. With this method, disparity with higher accuracy can be obtained efficiently for regions containing occlusion as well as regions free from occlusion. The resulting practical advantage is enormous.

The noise suppressing means 129 may be provided after the disparity integrating means 130.

Further, the low-evaluation region suppressing means 107 may be constructed not only to remove low (bad) evaluation regions but to use the median of the neighboring data. Alternatively, a mean weighted according to the evaluation value may be used.

Also, the region shifting means 111 may be constructed to shift the region in vertical or oblique directions instead of horizontal directions.

In the illustrated examples, two images are input, but the number of images input is not limited to two, and three or more images may be used for input. As the number of images increases, the amount of information also increases, and by combining disparityes obtained from various combinations of images, it is possible to increase the accuracy of processing.

[Equation 20] has been used to compute the correspondence between images, but [Equation 20] is not restrictive. For example, the absolute value term may be squared or may be raised to a higher power. Further, since the process is for the computation of correspondence, correlation values may be computed to achieve the same purpose.

(Embodiment 8)

Figure 23:
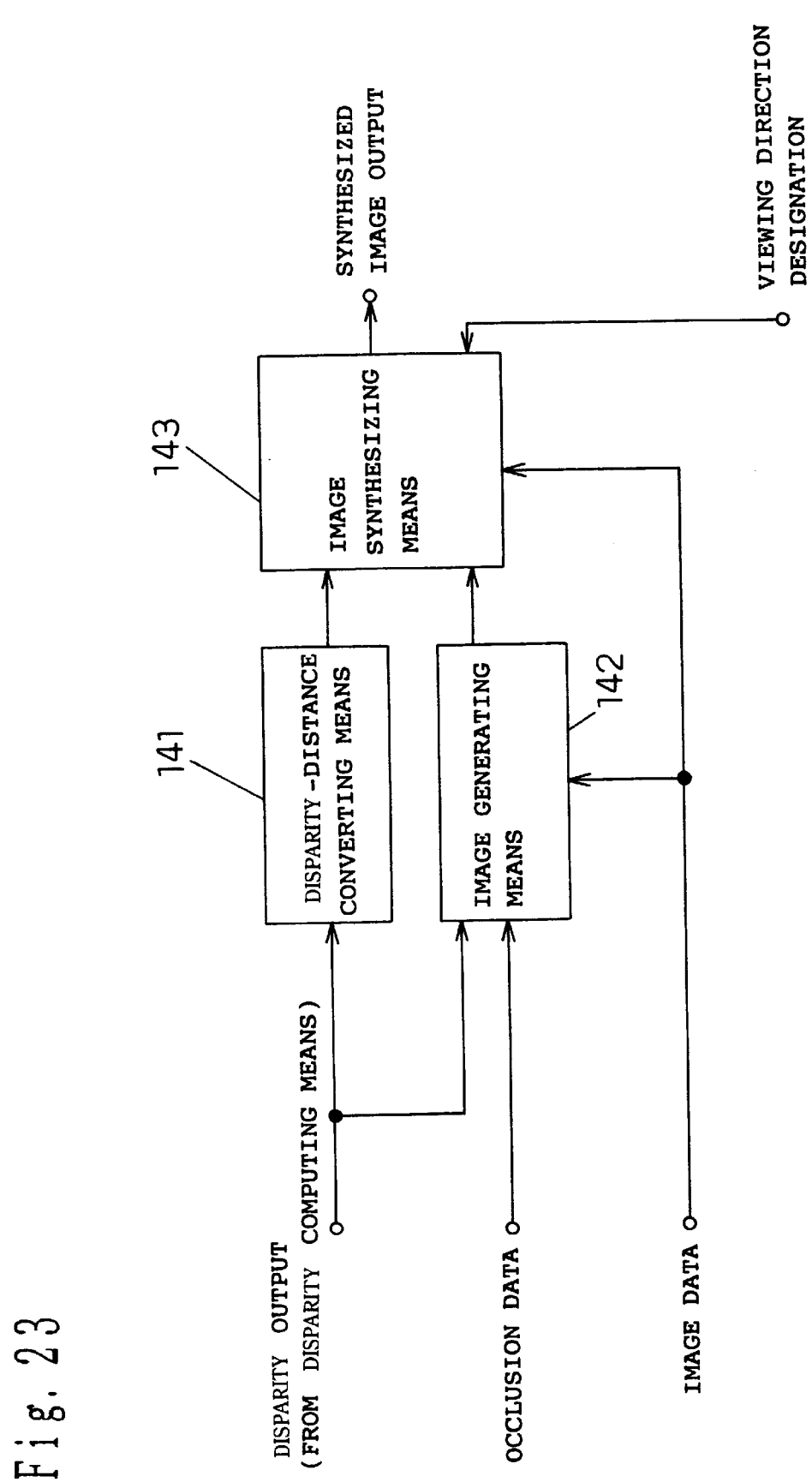
FIG. 23 is a diagram showing the configuration of an image synthesizing apparatus according to an eighth embodiment of the present invention.

Next, a configurational example of an image synthesizing apparatus incorporating the above disparity computing apparatus will be described with reference to accompanying drawings. FIG. 23 shows the configuration of a synthesizing section of the image synthesizing apparatus. A disparity detection section, constructed from the disparity computing apparatus of one of the fifth to seventh embodiments, is responsible for the processing in the first half of the image synthesizing apparatus. The input signals (data) shown in FIG. 23 are from the disparity computing apparatus. In FIG. 23, reference numeral 141 is a disparity-distance converting means for converting disparity data to distance data, 142 is an image generating means for generating an image of a hidden part of an occlusion region, and 143 is an image synthesizing means for synthesizing an image as viewed from a designated viewing direction by using the distance data, the generated image data, and the input image data. The operation of each part will be described below.

The input disparity data (designated as disparity output in FIG. 23) is the result of the disparity computation as described in the fifth to seventh embodiments. The disparity-distance converting means 141 converts the disparity data to the actual distance. The distance Z is obtained by [Equation 24]

$$Z=aF/d \qquad \text{[Equation 24]}$$

where a is the distance (baseline length) between the cameras used to shoot the images for which the disparity was obtained, F is the focal length of the camera lens, and d is the disparity. Next, based on the occlusion data and the disparity output data, the image generating means 142 detects which side of the occlusion region has the smaller disparity. The region lying on that side of the occlusion region is hidden by the object in the foreground and is not visible even to the camera that shot the occlusion region. The hidden region will be explained with reference to FIG. 24(a) to 24(c). FIG. 24(a) shows the image captured by the right camera, the occlusion region being indicated by oblique hatching. B is an image of the front object, and A is an image of the back object. The occlusion region indicated by oblique hatching corresponds to the left-hand region of the object A that is obstructed by the object B from being viewed (captured) by the left camera. The side view is shown in FIG. 24(b). If an image as viewed from direction V is to be synthesized, the image of a region C is missing since the region C is not visible even to the right camera. This missing image region is the hidden region lying on the side of the occlusion region that has the smaller disparity. To prevent an image dropout of this region, the image of the region C is generated. To accomplish this, the image of the occlusion region 0 and the region A to the right of it is reversed right and left and the resulting image is used as the image of the region C. This generation method is simple, and yet the generated image looks relatively natural. The generated image is given the same disparity as that of the occlusion region.

In this manner, the image generating means 142 generates the image of the region that is hidden behind another object and is not captured by the camera. Based on the thus generated image, the images captured by the cameras, and the distance data of various regions of the images, the image synthesizing means 143 synthesizes an image as viewed from a designated viewing direction. In synthesizing the image, first the designated viewing direction is evaluated in terms of the angle and the direction of displacement (to the right or diagonally to the left) relative to the shooting direction of the camera. Then, the image data is shifted toward the designated viewing direction (by the amount of displacement from the camera shooting direction). The shift amount S is determined by [Equation 25]

$$S=k/Z \qquad \text{[Equation 25]}$$

where k is a constant. Substituting [Equation 24] into [Equation 25] yields [Equation 26].

$$S=k/d/aF=bd \qquad \text{[Equation 26]}$$

where b is a constant, which is determined by the baseline length, the lens focal length, and the constant k. The image shift amount should basically be made proregional to the disparity d. The image is thus synthesized by shifting the image data toward the designated viewing direction by an amount proregional to the magnitude of the disparity. Image generation involving shifting an image in a vertical direction is performed in the following way. In a synthesized image, image data is extrapolated in a direction where no data is available by using an image of a region lying on the upper or lower side whichever is the more distant (whichever has the smaller disparity). This process is equivalent to rotating the processing direction of the occlusion region by 90 degrees. The image used for image synthesis should preferably be the one captured by the camera closer to the designated viewing direction, but either camera image, left-eye image or right-eye image, may be used. The image synthesis processing is performed by the image synthesizing means 143.

As described, according to the image synthesis method of the present invention, an image is generated for an image dropout region (where no image data is available) that occurs when the viewing direction is substantially displaced from the camera shooting direction. This enables a natural-looking, dropout-free image to be synthesized even when the viewing direction is substantially displaced.

The method of image generation is not limited to reversing the image of a region adjacent to the hidden region. For example, the image may be generated by using image data of a region on the non-occlusion side of an object opposite from the occlusion region (occlusion occurs due to the presence of the object, but the image data of the background where the occlusion by the object is not present is used).

Figure 25:
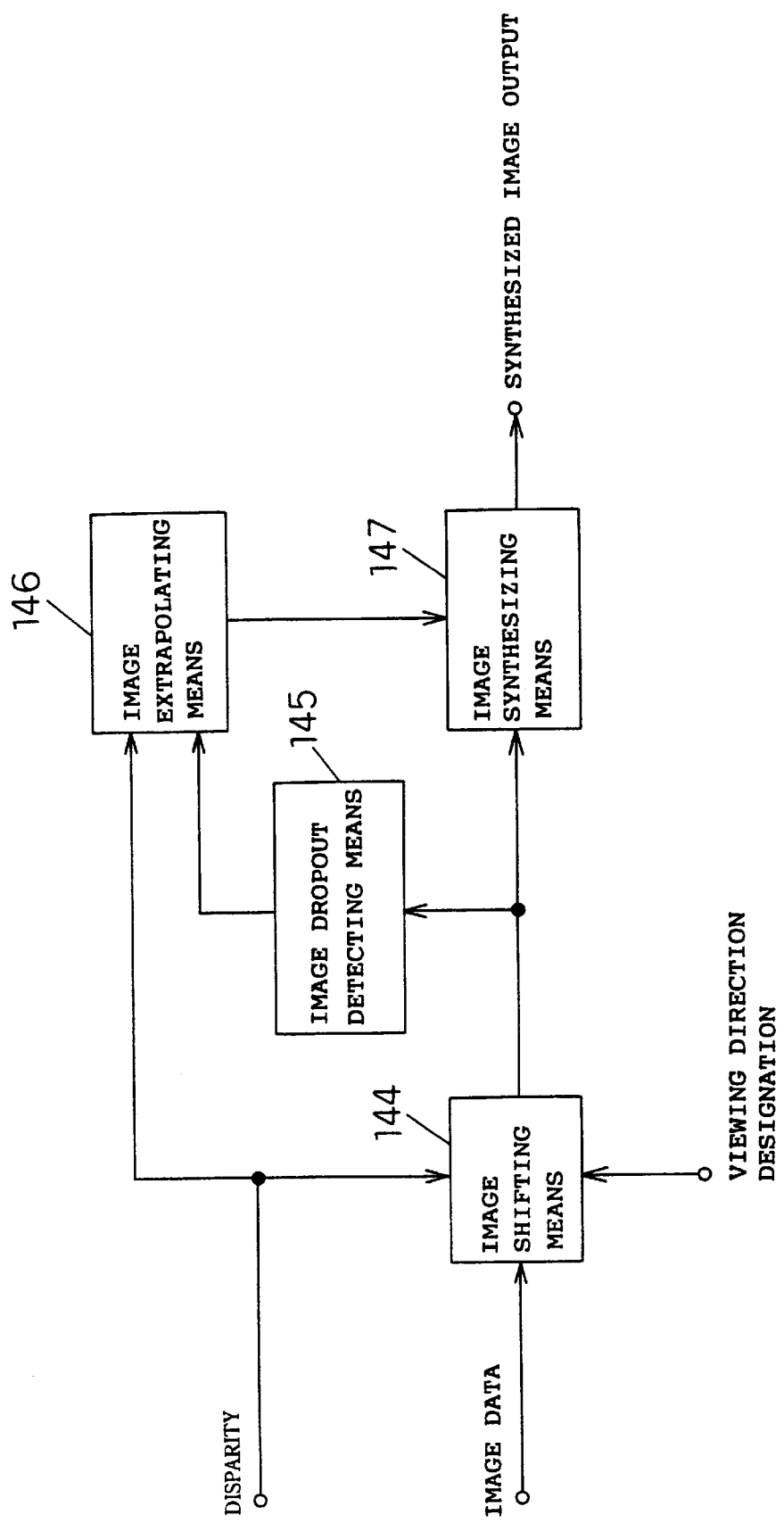
FIG. 25 is a block diagram showing another example of the image synthesizing apparatus according to the eighth embodiment of the present invention.

The image synthesis method may also be implemented using the configuration shown in FIG. 25, wherein reference numeral 144 is an image shifting means, 145 is an image dropout detecting means, 146 is an image extrapolating means, and 147 is an image synthesizing means. First, the image shifting means 144 shifts the image toward a direction corresponding to the designated viewing direction in accordance with the magnitude of the disparity. Next, the image dropout detecting means 145 detects a no-image data region that occurs as a result of the image shifting. Using image data of a region having the smallest disparity (the most distant region) of the regions around the detected no-image data region, data is extrapolated for the no-image data region. The extrapolation is performed by the image extrapolating means 146. The image data lying in the opposite direction from the direction of extrapolation is directly used to extrapolate the image. The extrapolated image and the image shifted to the direction corresponding to the viewing direction are combined together in the image synthesizing means 147.

The computations performed by the corresponding point computing means and disparity data computing means in the fifth to eighth embodiments may be performed using the methods and apparatus according to the first to fifth apparatus. In that case, the computation of the disparity near the disparity edge can be performed with proper block size, enabling the computation of corresponding points with higher accuracy.

With the above processing, the processing in the horizontal and vertical directions can be implemented using the same circuitry and processing software, which enhances image synthesis efficiency.

As described above, according to the present invention, the reliability of the result of estimation by block matching is evaluated on the basis of the luminance gradient, image noise, the minimum value of the evaluation yardstick for differences between blocks, and the block size, and the results of estimation obtained with different block sizes are integrated. Accordingly, depth and motion can be estimated with good accuracy without performing iterative calculations.

Furthermore, by correcting the minimum value of the evaluation yardstick for differences between blocks, and the coordinate error vector that gives the minimum value, on the basis of the distribution near the minimum value of the evaluation yardstick for differences, depth and motion can be estimated accurately to within subpixel accuracy.

Moreover, by adaptively displacing the attention pixel and the block center at the time of correlation computation and by selecting the estimate that yields the best evaluation value, estimation can be achieved with good accuracy for regions containing abrupt changes in depth and motion.

Further, when computing the correspondence between images using a small block size, the attention pixel is made to coincide with the block center, while when computing the correspondence between images using a large block size, the attention pixel and the block center are displaced adaptively, and the estimate that yields the best evaluation value is selected. This makes it possible to track the change of the estimation in regions where there are discontinuities in the motion and depth estimation.

Alternatively, when computing the correspondence between images using a small block size, the attention pixel and the block center are displaced adaptively, and when computing the correspondence between images using a large block size, the attention block is made to coincide with the block center. This makes it possible to smoothly change the motion and depth estimation in hidden regions.

Furthermore, when computing correlation using a large block size, the computation of correlation is performed not on all pixels in the block but only on representative pixels within the block. This reduces the amount of computation while retaining the accuracy.

As described, according to the present invention, the reliability of the result of estimation by block matching is evaluated on the basis of the luminance gradient, image noise, the minimum value of the evaluation yardstick for differences between blocks, and the block size, and the results of estimation obtained with different block sizes are integrated. Accordingly, depth and motion can be estimated with good accuracy without performing iterative calculations. This provides an enormous advantage.

If there is occlusion by an object, an image to be used as a base image is changed and correspondence is examined under different hiding conditions, thereby making it possible to correctly judge the occlusion. Also, for regions where correct correspondence cannot be established because of a disparity boundary, correspondence can be obtained by shifting the region for correspondence computation. This technique makes it possible to obtain correct correspondence up to the disparity boundary.

Furthermore, by estimating the disparity boundary using the luminance boundary and the correspondence evaluation value, disparity with high resolution can be estimated from the correspondence computation result having low resolution to the disparity boundary, thus making it possible to obtain disparity with higher accuracy efficiently. Moreover, the disparity boundary associated with an occlusion region can be correctly estimated using the disparity boundary of a non-occlusion region, its correspondence, and the luminance boundary, and the disparity of an occlusion region can be obtained with higher accuracy efficiently. The practical advantage offered by this is enormous.

Also, in image synthesis, the disparity boundary can be correctly obtained and, when the viewing direction is varied, the image boundary that provides the disparity boundary can be accurately synthesized.

Furthermore, by extrapolating a no-image data region from the neighboring image data based on occlusion information and disparity information, image dropout can be prevented and a natural-looking image can be synthesized even when the viewing direction is displaced substantially.

What is claimed is:

1. An image synthesizing apparatus, comprising:

a disparity estimation apparatus, said disparity estimation apparatus comprising correspondence determining means, for determining correspondence between a first image and a second image; disparity data computing means for computing disparity data for the first image and the second image based upon correspondence determined by the correspondence determining means; occlusion judging means for judging occlusion portions of the second image which are not included in the first image, based upon the disparity data; and disparity supplementing means for supplementing disparity data for the occlusion portions of the second image;

disparity distance converting means, for converting the supplemented disparity data into distance data;

image generating means for generating hidden image data for a hidden portion of the second image based upon the occlusion portion, the supplemented disparity data, and the image data; and image synthesizing means for synthesizing a third image from the image data and the hidden image data, wherein the image generating means detects which side of the occlusion portion has a greater disparity;

determines the hidden portion to be on the detected side of the occlusion portion; and employs image data for the occlusion portion and image data for a side of the occlusion portion in the second image opposite the selected side as the hidden image data.

2. An image synthesizing apparatus, comprising:

a disparity estimation apparatus, said disparity estimation apparatus comprising correspondence determining means, for determining correspondence between a first image and a second image; disparity data computing means for computing disparity data for the first image and the second image based upon correspondence determined by the correspondence determining means; occlusion judging means for judging occlusion portions of the second image which are not included in the first image, based upon the disparity data; and disparity supplementing means for supplementing disparity data for the occlusion portions of the second image;

disparity distance converting means, for converting the supplemented disparity data into distance data;

image generating means for generating hidden image data for a hidden portion of the second image based upon the occlusion portion, the supplemented disparity data, and the image data; and image synthesizing means for synthesizing a third image from the image data and the hidden image data, wherein the image generating means detects which side of the occlusion portion has a greater disparity;

determines the hidden portion to be on the detected side of the occlusion portion; and employs image data for a side of the occlusion portion in the second image opposite the selected side as the hidden image data.

3. A method of estimating disparity for a first image and a second image, comprising:

determining correspondence between the first image and the second image;

computing disparity data for the first image and the second image based upon the determined correspondence;

judging occlusion portions of the second image which are not included in the first image, based upon the disparity data; and supplementing disparity data for the occlusion portions of the second image, wherein the supplementation of disparity data for the occlusion portions of the second image includes:

selecting an occlusion portion;

determining which portion of the second image adjacent the occlusion portion has the smallest disparity; and employing the disparity data for the determined portion of the second image adjacent the occlusion portion to supplement the disparity data for the occlusion portion, the disparity data being supplemented in a direction from the determined portion of the second image to a side of the occlusion portion opposite the determined portion of the second image.

4. A method of synthesizing an image, comprising:

estimating disparity for a first image and a second image, to obtain supplemented disparity data, by determining correspondence between the first image and the second image; computing disparity data for the first image and the second image based upon the determined correspondence; judging occlusion portions of the second image which are not included in the first image, based upon the disparity data; supplementing disparity data for the occlusion portions of the second image; storing evaluation data of the determined correspondence; and suppressing disparity data for uncertain portions of the first and second images for which corresponding evaluation data does not meet a first predetermined threshold, wherein judging occlusion portions of the second image which are not included in the first image, is further based on the evaluation data;

converting the supplemented disparity data into distance data;

generating hidden image data for a hidden portion of the second image based upon the occlusion portion, the supplemented disparity data, and the image data; and synthesizing a third image from the image data and the hidden image data, wherein the supplementation of disparity data for the occlusion portions of the second image includes:

selecting an occlusion portion;

determining which portion of the second image adjacent the occlusion portion has the smallest disparity; and employing the disparity data for the determined portion of the second image adjacent the occlusion portion to supplement the disparity data for the occlusion portion, the disparity data being supplemented in a direction from the determined portion of the second image to a side of the occlusion portion opposite the determined portion of the second image.

5. A method of synthesizing an images, comprising:

estimating disparity for a first image and a second image, to obtain supplemented disparity data, by determining correspondence between the first image and the second image; computing disparity data for the first image and the second image based upon the determined correspondence; judging occlusion portions of the second image which are not included in the first image, based upon the disparity data; supplementing disparity data for the occlusion portions of the second image; storing evaluation data of the determined correspondence; and suppressing disparity data for uncertain portions of the first and second images for which corresponding evaluation data does not meet a first predetermined threshold, wherein judging occlusion portions of the second image which are not included in the first image, is further based on the evaluation data;

converting the supplemented disparity data into distance data;

generating hidden image data for a hidden portion of the second image based upon the occlusion portion, the supplemented disparity data, and the image data; and synthesizing a third image from the image data and the hidden image data, wherein the generation of hidden image data for a hidden portion of the second image includes:

detecting which side of the occlusion portion has a greater disparity;

determining the hidden portion to be on the detected side of the occlusion portion; and employing image data for the occlusion portion and image data for a side of the occlusion portion in the second image opposite the selected side as the hidden image data.

6. A method of synthesizing an images, comprising:

estimating disparity for a first image and a second image, to obtain supplemented disparity data, by determining correspondence between the first image and the second image; computing disparity data for the first image and the second image based upon the determined correspondence; judging occlusion portions of the second image which are not included in the first image, based upon the disparity data; supplementing disparity data for the occlusion portions of the second image; storing evaluation data of the determined correspondence; and suppressing disparity data for uncertain portions of the first and second images for which corresponding evaluation data does not meet a first predetermined threshold, wherein judging occlusion portions of the second image which are not included in the first image, is further based on the evaluation data;

converting the supplemented disparity data into distance data;

generating hidden image data for a hidden portion of the second image based upon the occlusion portion, the supplemented disparity data, and the image data; and synthesizing a third image from the image data and the hidden image data, wherein the generation of hidden image data for a hidden portion of the second image includes:

detecting which side of the occlusion portion has a greater disparity;

determining the hidden portion to be on the detected side of the occlusion portion; and employing image data for a side of the occlusion portion in the second image opposite the selected side as the hidden image data.

7. A method of synthesizing an image, comprising:

estimating disparity for a first image and a second image by determining correspondence between the first image and the second image; computing disparity data for the first image and the second image based upon the determined correspondence; judging occlusion portions of the second image which are not included in the first image, based upon the disparity data; and supplementing disparity data for the occlusion portions of the second image, to obtain supplemented disparity data;

shifting at least the second image according to a designated viewing direction;

detecting no-image data regions which occur in at least the second image as a result of the image shift;

extrapolating image data for the no-image data regions based upon the image data; and synthesizing a third image from the image data and the extrapolated image data, wherein the supplementation of disparity data for the occlusion portions of the second image includes:

selecting an occlusion portion;

determining which portion of the second image adjacent the occlusion portion has the smallest disparity; and employing the disparity data for the determined portion of the second image adjacent the occlusion portion to supplement the disparity data for the occlusion portion, the disparity data being supplemented in a direction from the determined portion of the second image to a side of the occlusion portion opposite the determined portion of the second image.

* * * * *